United States Patent [19]
Kashihara et al.

[11] Patent Number: 6,111,655
[45] Date of Patent: Aug. 29, 2000

[54] METHOD AND SYSTEM FOR MANAGING COMPONENT DATA OF THE DESIGN PROCESS AND PREPRESS PROCESS OF A PRINTING OPERATION

[75] Inventors: Hideaki Kashihara; Katsuya Yamaguchi; Koji Hatta, all of Kyoto, Japan

[73] Assignee: Dainippon Screen Mfg Co., Ltd., Kyoto, Japan

[21] Appl. No.: 08/337,823

[22] Filed: Nov. 8, 1994

[30] Foreign Application Priority Data

Nov. 11, 1993 [JP] Japan ..................... 5-282263

[51] Int. Cl.⁷ .................................. G06F 15/00
[52] U.S. Cl. .......................... 358/1.18; 707/102
[58] Field of Search ............. 395/600; 364/DIG. 1; 707/101, 102; 358/1.18

[56] References Cited

U.S. PATENT DOCUMENTS

| | | | |
|---|---|---|---|
| 4,885,704 | 12/1989 | Takagi et al. | 364/521 |
| 5,293,475 | 3/1994 | Hennigan et al. | 395/148 |
| 5,295,261 | 3/1994 | Simonetti | 395/600 |
| 5,321,831 | 6/1994 | Hirose | 395/600 |
| 5,339,412 | 8/1994 | Fueki | 395/600 |
| 5,363,504 | 11/1994 | Hasuo | 395/600 |
| 5,404,479 | 4/1995 | Yamamoto | 395/425 |
| 5,434,645 | 7/1995 | Usami | 355/38 |
| 5,467,440 | 11/1995 | Nihei | 395/133 |
| 5,724,491 | 3/1998 | Kashihara | 395/117 |

FOREIGN PATENT DOCUMENTS

| | | |
|---|---|---|
| 0351433 | 8/1988 | European Pat. Off. . |
| 0397242 | 5/1990 | European Pat. Off. . |
| WO94/08310 | 4/1994 | WIPO . |
| WO95/02224 | 1/1995 | WIPO . |

*Primary Examiner*—Jean R. Homere
*Attorney, Agent, or Firm*—McDermott, Will & Emery

[57] ABSTRACT

Method and system for managing component data for design and prepress process using component layout information corresponding to a plurality of component areas laid out on a base sheet, each component area corresponding to either an image component, text component or linework component. The size of the base sheet and component area of each component to be laid out on the base sheet is determined and recorded in a memory means storing file name data of each component to be laid out in each of the component areas in a tree structure. Data for command sheet for each component is generated and recorded for each component with a file name attached. Each command sheet is generated using the tree structure of file name data of each component recorded in the memory and the original of component data in the tree structure of file name data of components recorded in the memory means is inserted.

12 Claims, 22 Drawing Sheets

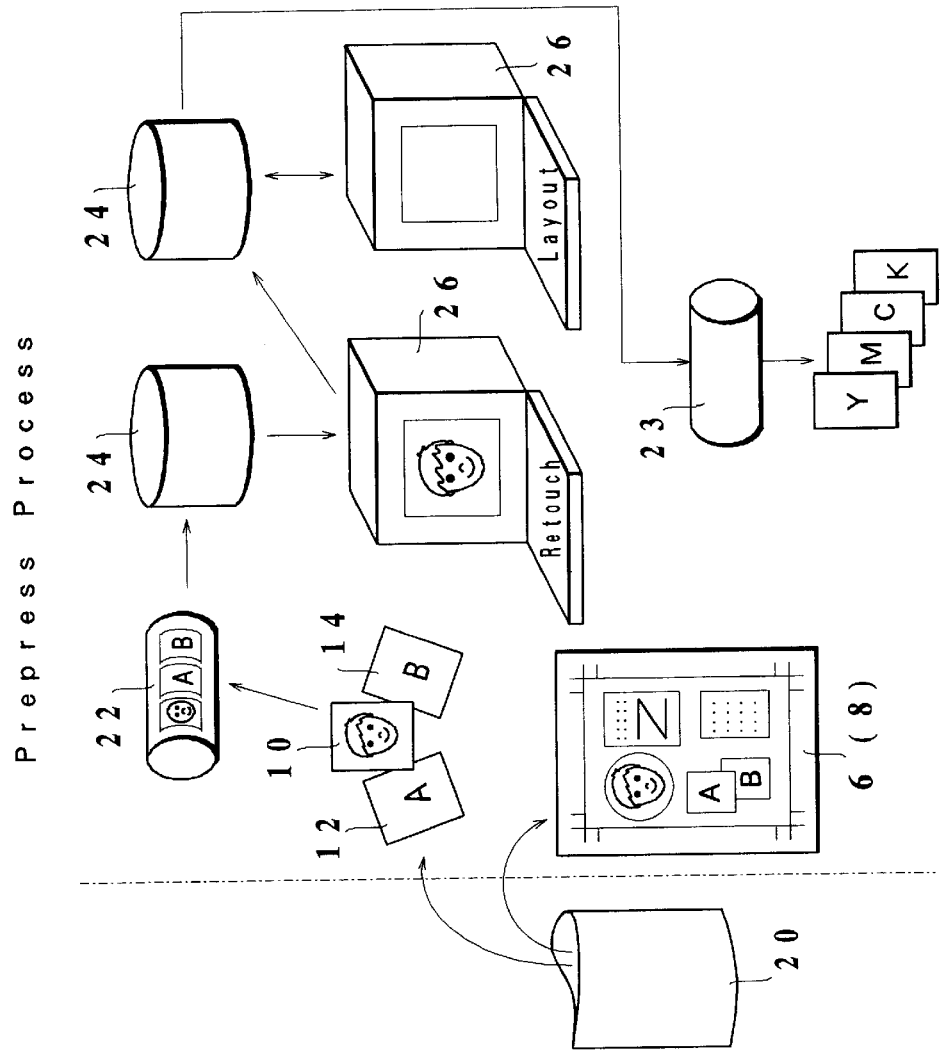

FIG. 21
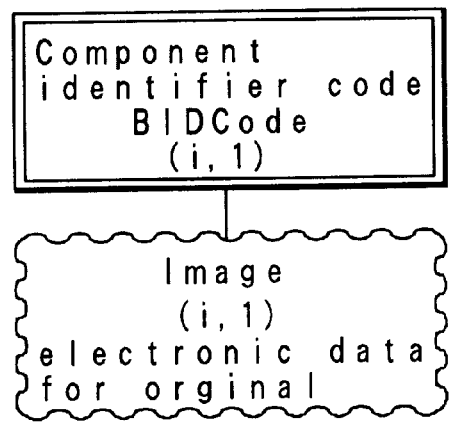
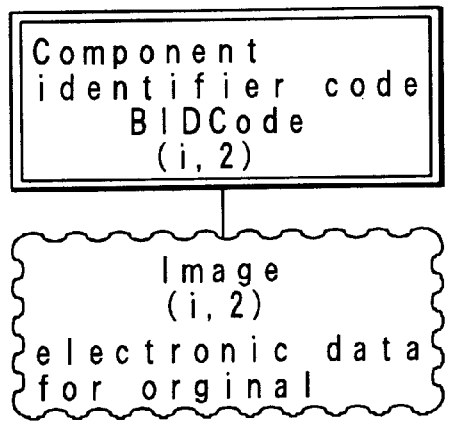
...........................
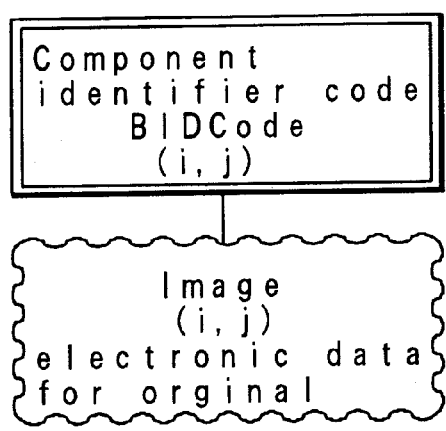

METHOD AND SYSTEM FOR MANAGING COMPONENT DATA OF THE DESIGN PROCESS AND PREPRESS PROCESS OF A PRINTING OPERATION

BACKGROUND OF INVENTION

1. Field of the Invention

This invention relates to a method for managing component data in design process and prepress process.

2. Description of the Prior Art

FIG. 1 and FIG. 2 show conceptual diagrams of the design process and prepress process in producing printed matter or printed material (hereinafter called as prints). FIG. 1 shows the design process and FIG. 2 shows the prepress process. In the design process, a designer makes a rough sketch to determine layout of image (pictorial patterns), text, and line work etc. Next, the designer hands text component 5, image component 10, 12, and 14 to operators. The operator who received the text component 5 enters the text using a computer 3, the text data is stored on a flexible disk (hereinafter called FD) 9 as electronic data and hand in the FD to the designer. Also, the operator who received the image component 10, 12 and 14 performs reading by an input scanner 7, and the read image data are stored on the FD 11 as electronic data and hand in the FD to the designer. While the image components 12 and 14 are represented respectively by letters A and B for convenience, they are actually pictorial patterns (images). Also, in case of line work component, the operator makes electronic data of the line work component using computer 3 in accordance with the letters A and B.

The designer reads the electronic data of the image component, the text component, and the line work component stored on the FD 9 and FD 11 which is handed in from the operators into the computer 2, and makes layout data by laying out the respective components on a base sheet in a display. The layout data thus made is outputted from a printer 4 to produce a layout paper 6. While, the images, texts, and lineworks on the layout paper 6 shown in FIG. 3A are not necessarily identical to those on a final print. While they may be different in hue and saturation, they suffice to show the layout of components. For example, a corresponding image component 16 on the layout paper 6 is shown to determine the layout of the image component 10, a corresponding image component 13 to determine the layout of the image component 12, and a corresponding image component 15 to determine the layout of the image component 14. Corresponding text components 17 and 19 are shown to determine the layout of respectively corresponding text components.

Separately from the layout paper 6, an instruction sheet 8 is prepared on a transparent sheet shown in FIG. 3B. The instruction sheet 8 is to be superposed on the layout paper 6 for use and part of work contents to be carried out for each of the components at the time of prepress is described on it.

The layout paper 6, instruction sheet 8, image components 10, 12, 14, and a FD storing the layout data which is result of page make up of the text components and the line work components are put into a work bag 20 which is handed from the design process to the prepress process (Refer to FIG. 1).

In the prepress process shown in FIG. 2, the image components 10, 12 and 14 are read by an input scanner 22, and electronic data is stored on a magnetic disk 24. A prepress operator then makes a computer 26 to read and display the image data 10 stored on the magnetic disk 24, and retouches the image component 10 according to the layout paper 6 and the instruction sheet 8. The retouch work is done, for example, by cutting to the size indicated on the layout paper 6 and the instruction sheet 8, hue adjustment, enlargement or reduction, rotation, etc. The retouched image component 10 is again stored on the magnetic disk 24. In a similar manner, the image components 12 and 14 are also retouched.

The components are then laid out according to the layout paper 6 and the instruction sheet 8. Based on the laid out data, an output scanner 23 makes out individual single color films in yellow (Y), magenta (M), cyan (C), and black (K). After exposure and development processes using these single color films, printing plates (not shown) for respective colors are prepared.

The conventional method described above has the following disadvantages. When the designer lays out the components stored on the FD 9 and FD 11 from the operator, on the base sheet in a display, it is necessary to display contents of each components and carrying out confirmation of the components respectively. However, the work mentioned above is very complex, since many of the components are necessary when a large number of the components are prepared once, so that, searching of the components take much time, the work efficiency is considerably lowered. Also, similar problems are likely to occur in the prepress process.

SUMMARY OF THE INVENTION

It is an object of the present invention to resolve the above described problems and provide a method for managing component data from the design process through the prepress process unitarily.

Method for managing component data in accordance with the present invention using component layout information laid out each component area corresponding to respective image component, text component and linework component on a base sheet, comprises the steps of;

component layout information generating step for determining size of base sheet and component areas of respective component to be laid out on the base sheet, for recording them as electronic data, for determining the file name for recording electronic data for original of component to be laid out to respective component areas in corresponding to the respective component areas, and for recording file name of electronic data for original of components contained in the base sheet under tree structure, component generating step for original for generating electronic data for original of each component and for recording electronic data for original of each generated components which is attached with file name in according to command of the component layout information, and tie-up step for inserting corresponding electronic data for original of component in according to file name thereof, into tree structure of files for recorded electronic data for original.

A system for managing component data include image components, text components and linework components in accordance with the present invention using the component layout information laid out on the base sheet corresponding to respective component data, for design and prepress system comprises:

processing means for designer for determining size of the base sheet and component area of each components to be laid out on the base sheet, and having a memory means recording the size of the base sheet and component area of each components as electronic data, said memory means of the processing means for designer, storing file name of electronic data of the component to be laid out in each of the component areas under tree structure, processing means for component operators for generating electronic data for command sheet of each components, and for recording generated electronic data for command sheet of each components in the memory means of the processing means for designer with attaching the file name obtained which corresponds to the generated electronic data for command sheet of each components by communicating with the processing means for designer, command sheet generating means for generating the command sheets using and tree structure of file name of the components recorded in the memory means of the processing means for designer and electronic data for command sheet and for outputting the command sheets, tie-up means for receiving electronic data for original of the each component with attaching file name in according to instruction of the component layout information of the command sheet, and for inserting the electronic data for original of corresponding components according to file name of the electronics data for original in the tree structure of file of the components recorded in the memory means of the processing means for designer.

While the novel features of the invention are set forth in a general fashion, both as to organization and content, will be better understood and appreciated, along with other objections and features thereof, from the following detailed description taken in conjunction with the drawings.

BRIEF DESCRIPTION OF THE DRAWINGS

FIG. 2 is a conceptual diagram showing conventional prepress processes.

FIG. 21 is a view illustrating a data structure showing a relationship between component identifiers and electronic data for original of components in equipment apparatus 35 for component processing.

DETAILED DESCRIPTION OF THE PREFERRED EMBODIMENT

Figure 5:
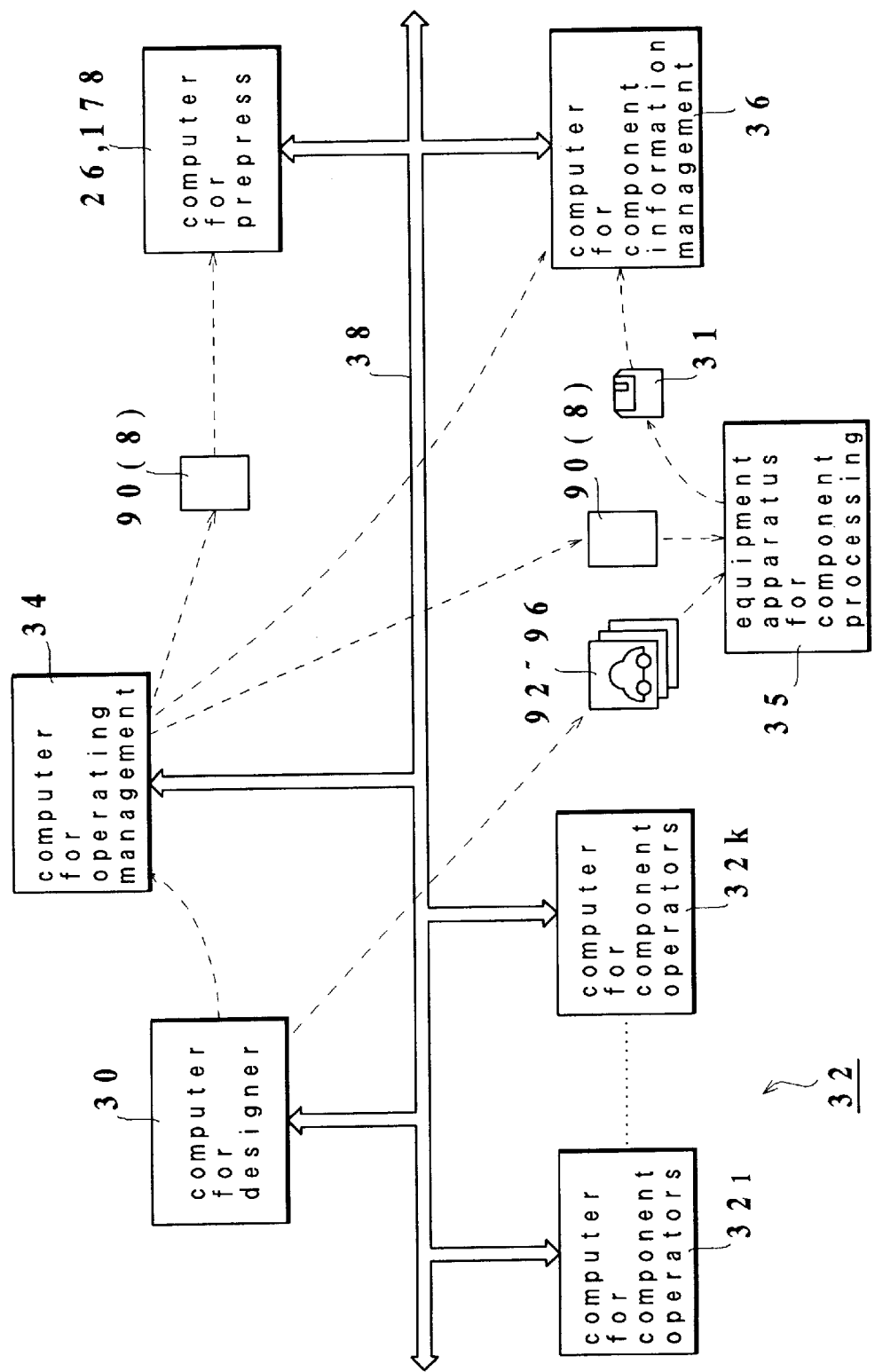
FIG. 5 is a view showing the structure of a system using for a method for managing component data for prepress as an embodiment of the present invention.

FIG. 5 shows a structure of a system using a method for managing component data for prepress as an embodiment of the present invention. A computer 30 for designer, a computer 32 for components operators ($32_1$ through $32_k$) a computer 34 for operating management, a computer 36 for component information management and a computer 26 for prepress, 178 are connected with each other by a communication line 38 with forming a network. Each of the computers shown in FIG. 5 has CRT monitor, magnetic disk, printer etc. While the equipment apparatus is represented by number 35 in the FIG. 5.

Figure 6:
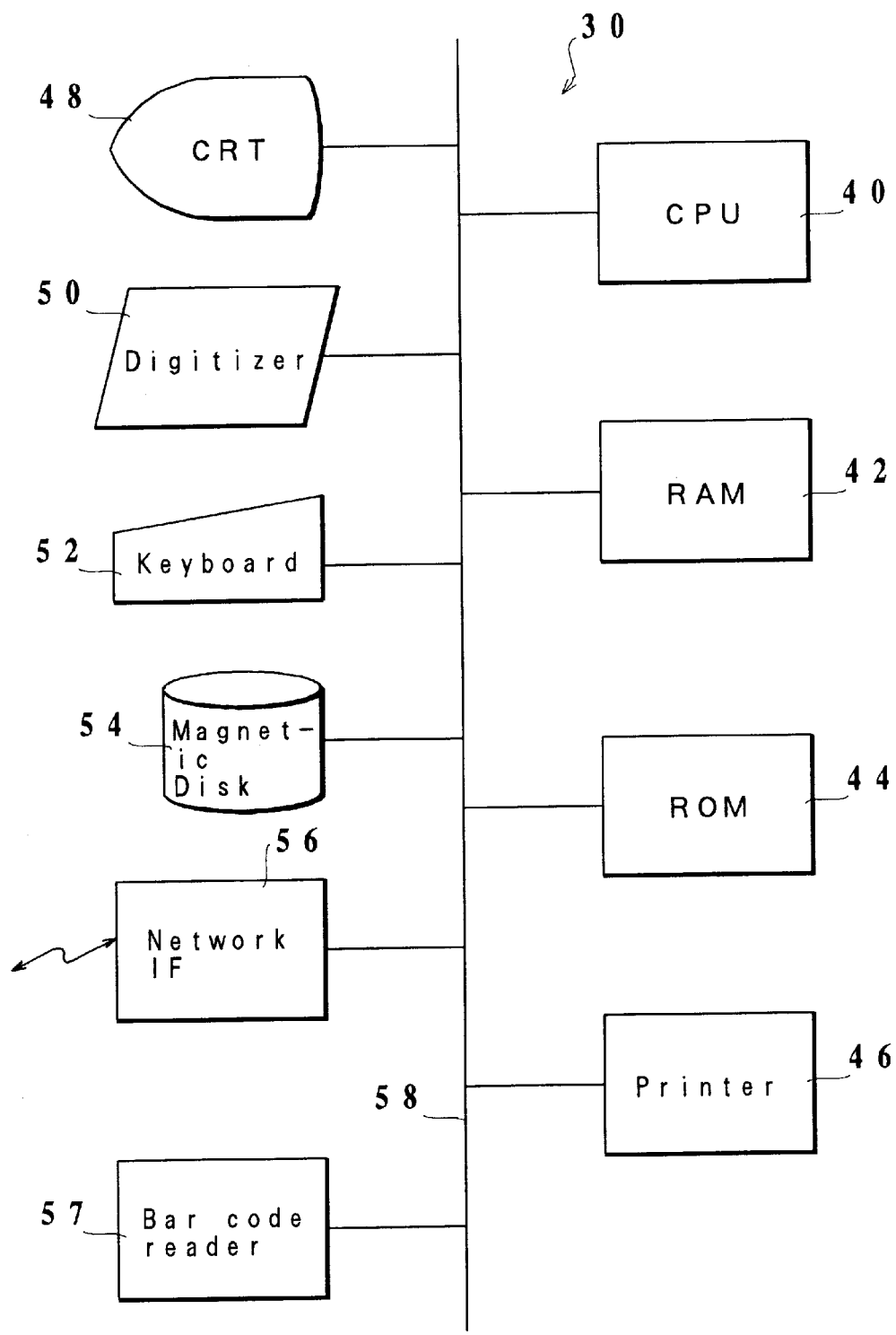
FIG. 6 is a block diagram showing a computer 30 for designer.
Figure 7:
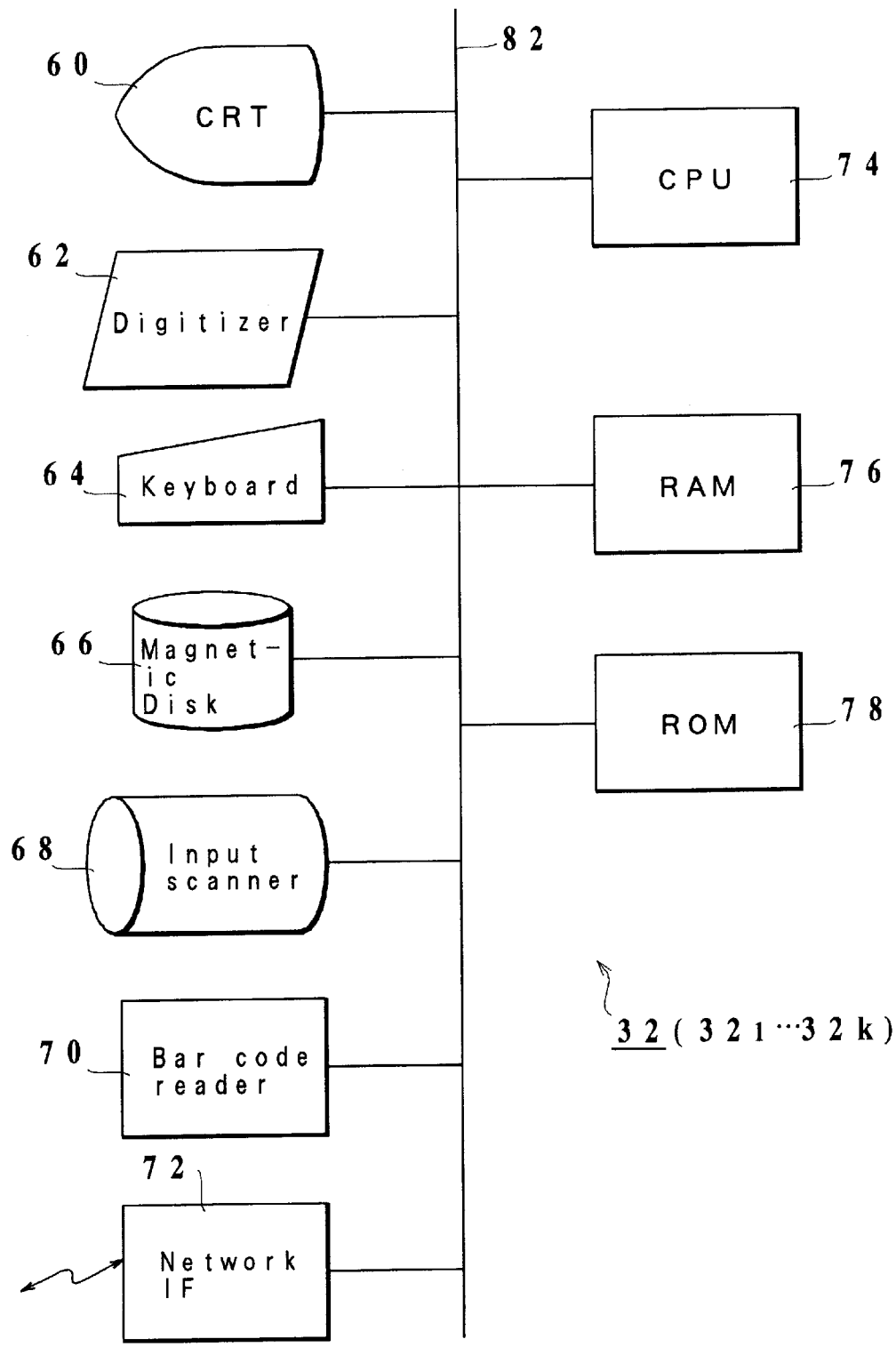
FIG. 7 is a block diagram showing a computer 32 for components operators.
Figure 8:
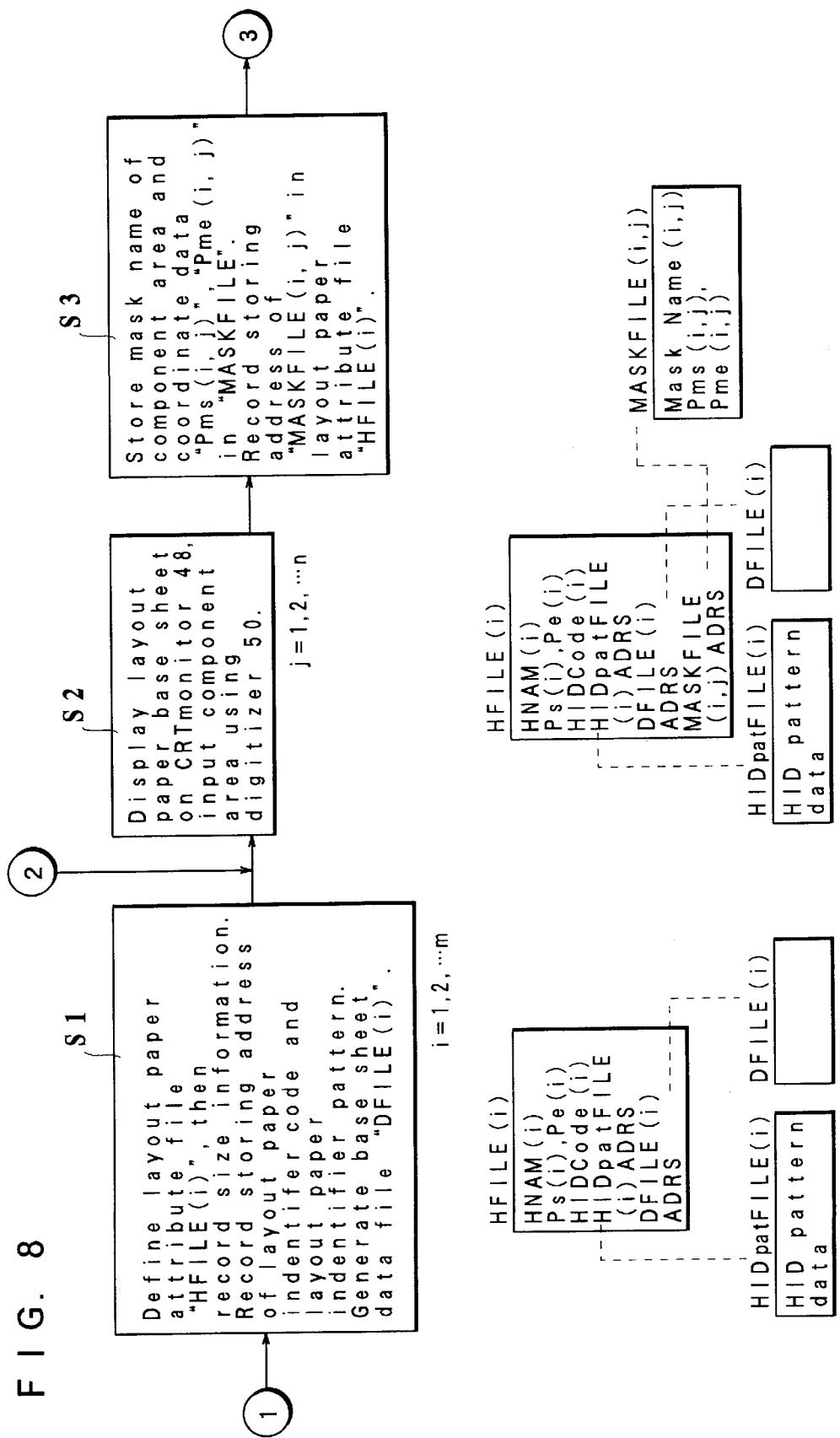
FIG. 8 through FIG. 12 are flow charts showing the processes of preparing the prepress command sheet.
Figure 9:
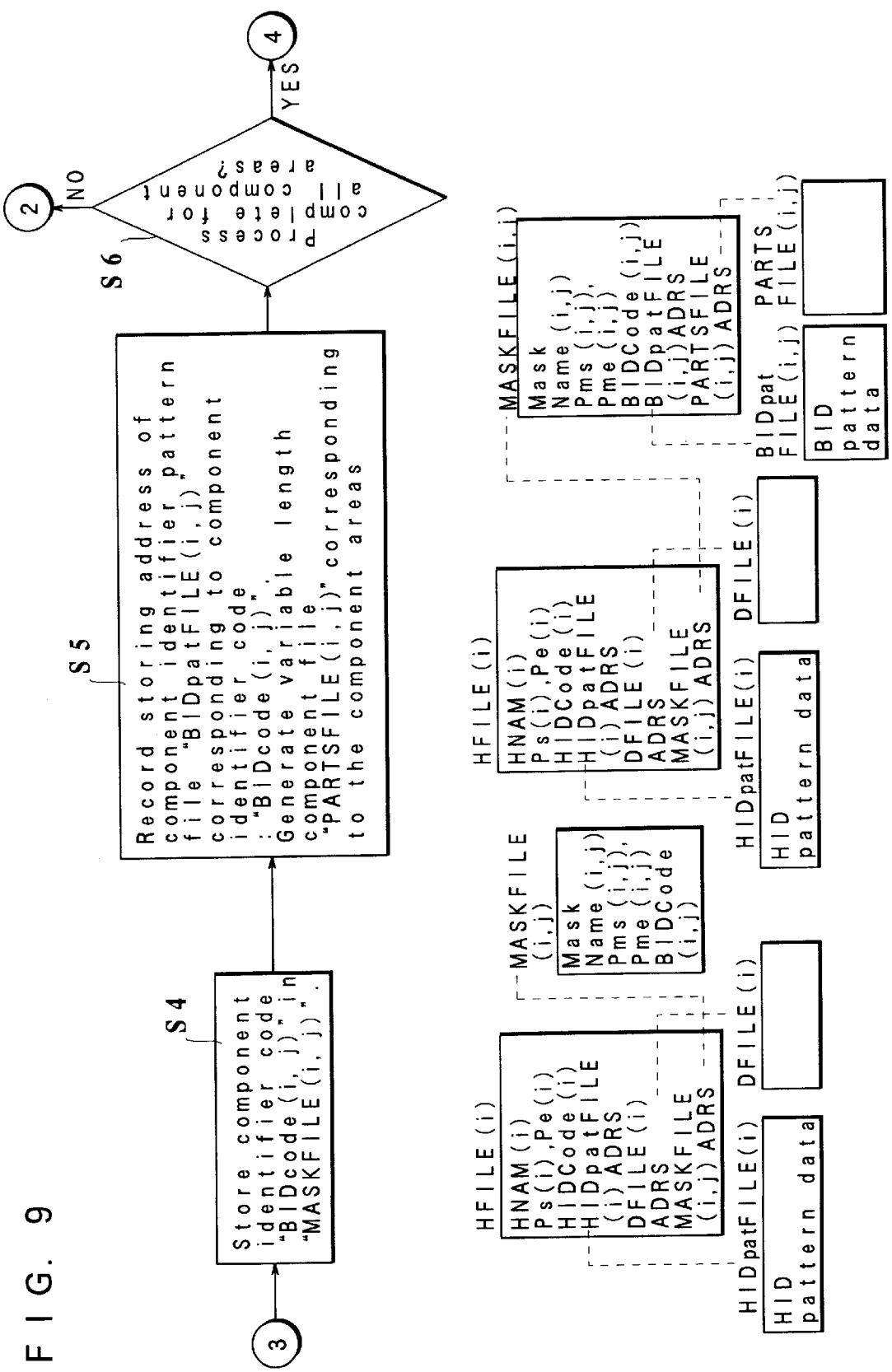
Figure 10:
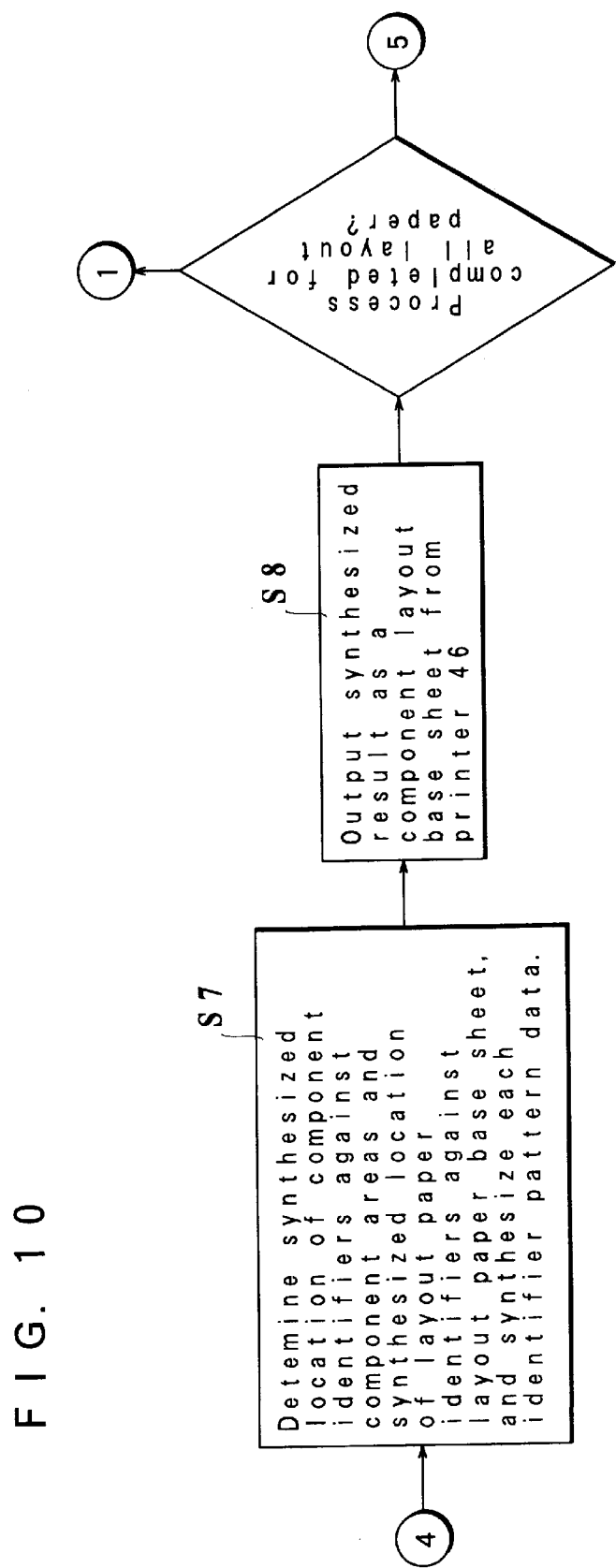

FIG. 6 shows a structure of the computer 30 for designer in block diagram. CPU 40 is connected to a bus line 58. The CRT monitor 48, keyboard 52, magnetic disk 54, network interface 56, bar code reader 57, RAM 42, ROM 44 and a printer 46 are also connected to the bus line 58. FIG. 7 shows a structure of the computer 32 for components operators in block diagram. CPU 74 is connected to a bus line 82. A CRT monitor 60, digitizer 62, keyboard 64, magnetic disk 66, input scanner 68, bar code reader 70, network interface 72, RAM 76 and ROM 78 are also connected to the bus line 82.

Figure 13:
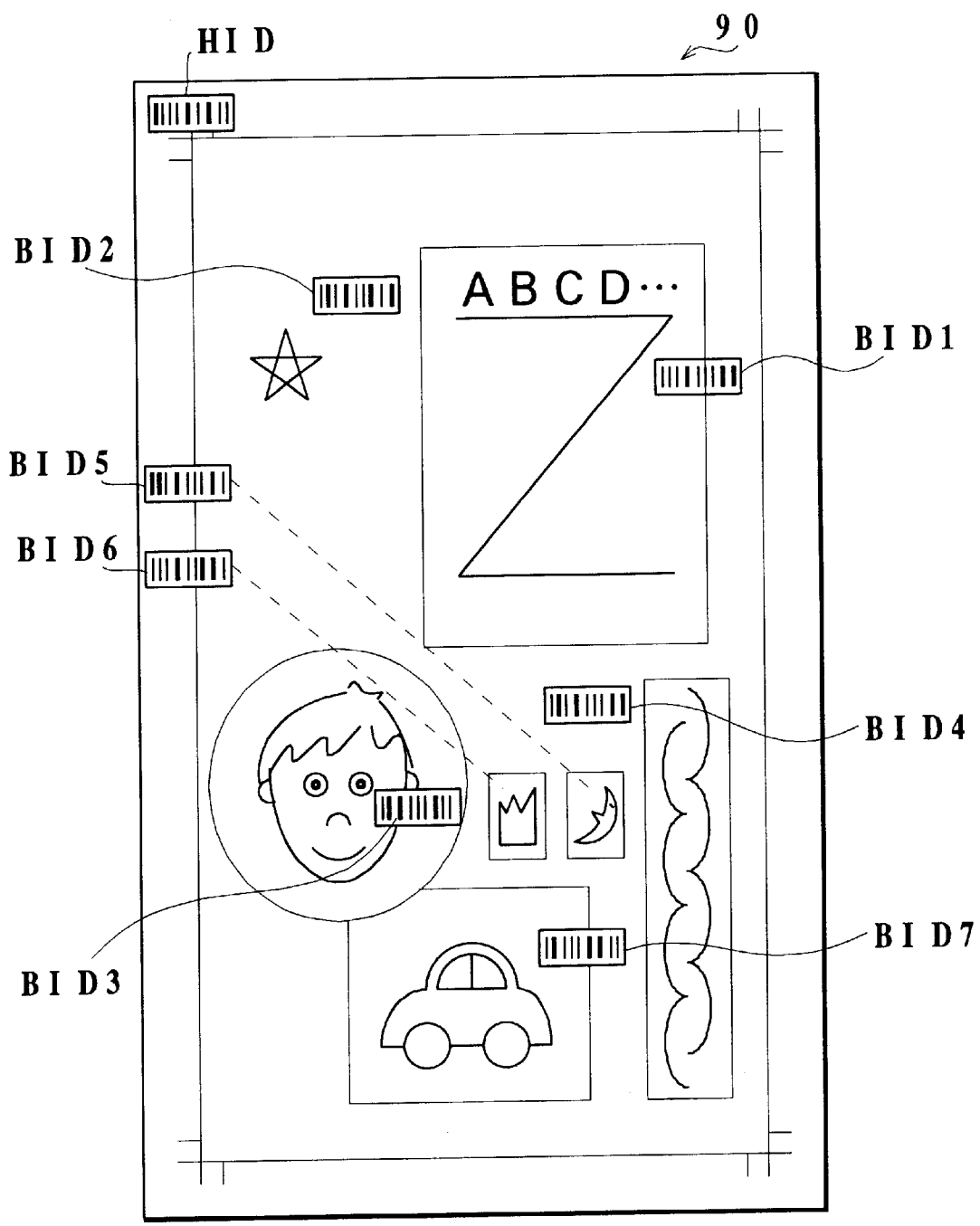
FIG. 13 is a view showing the completed layout paper (prepress command sheet) 90.

A procedure for making out the prepress command sheet using the computer 30 for designer and the computer 32 for components operators will be described. Flow charts illustrating the procedure are shown in FIGS. 8 through 12. Here, the prepress command sheet shown in FIG. 13 is prepared.

Figure 14B:
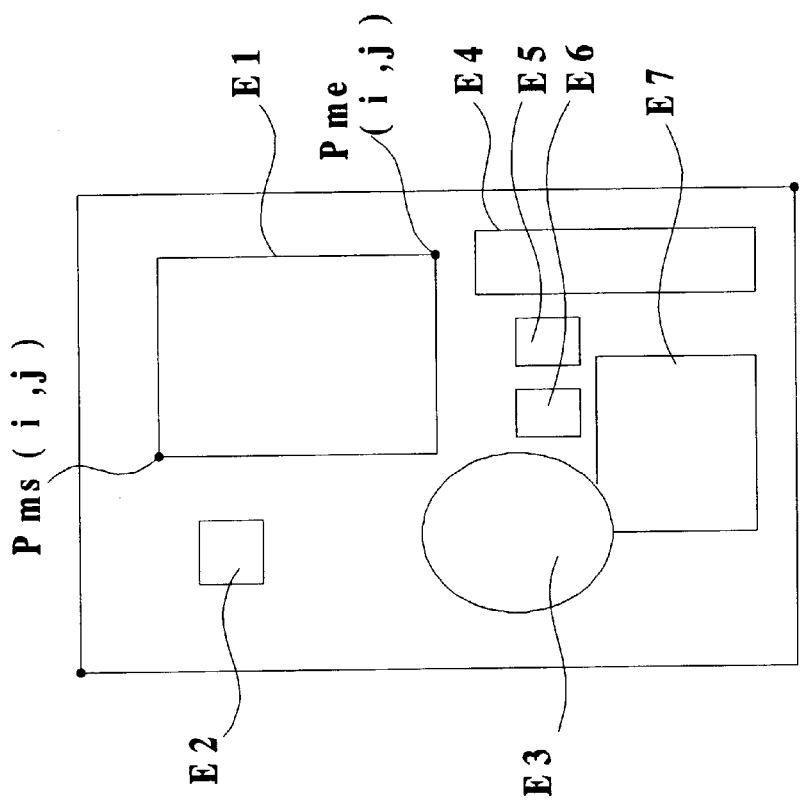
FIG. 14A and FIG. 14B are view showing a displayed condition of electronic data of a component layout base sheet on the CRT monitor 48.
Figure 14A:
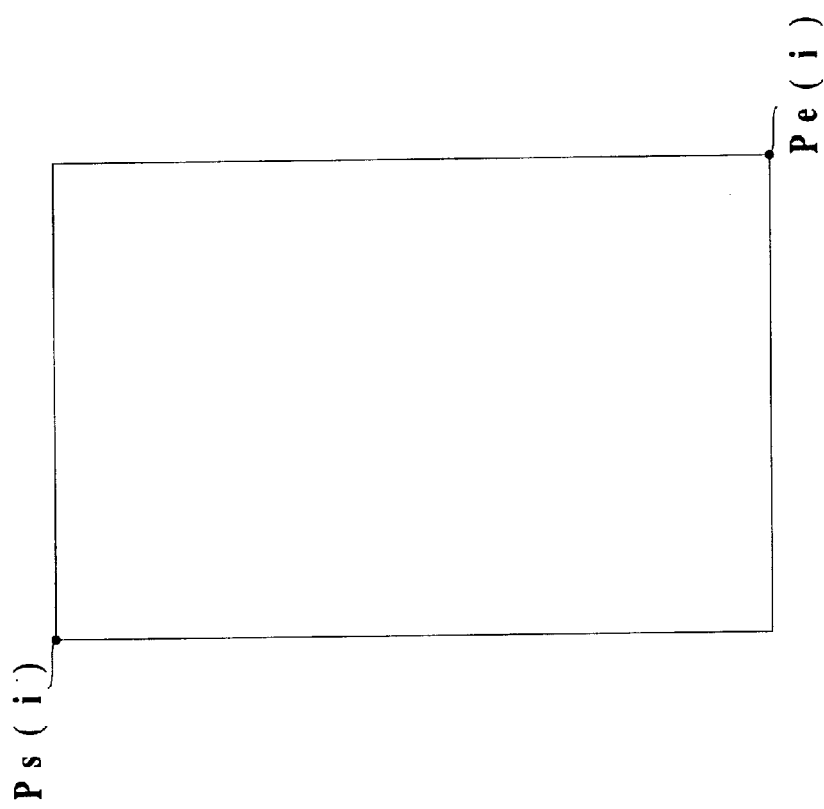

First, the designer defines a layout paper attribute file "HFILE(i)" using the computer 30 for designer shown in FIG. 6. In other words, a layout paper name "HNAM(i)" is written. Next, size of the layout attribute file "HFILE(i)" (size information) is entered by the digitizer 50 (Step S1). In other words, coordinate data for the diagonal two points which define the size as shown in FIG. 14A, that is the start point "Ps(i)" and the end point "Pe(i)" are entered. In the step S1, next, layout paper identifier code "HIDcode(i)" is written in the layout paper attribute file "HFILE(i)", then a storage address "HIDpatFILE(i)ADRS" of layout paper identifier pattern file "HIDpatFILE(i)" is written. Here, the layout paper identifier is pasted to every layout papers to identify the layout papers. While, pattern data (for example bar code) which is stored on the magnetic disk 54 previously is automatically selected and used. Further, in the Step 1, base sheet data file "DFILE(i)" is prepared, and storage address "DFILE(i)ADRS" of the base sheet data file "DFILE(i)" is written in the layout paper attribute file "HFILE(i)". The layout paper attribute file "HFILE(i)" and the base sheet data file "DFILE(i)" are stored on the magnetic disk 54. While, the variable "i" represents integers 1, 2 through m, each indicating sequence number for layout paper.

In step S2, the CPU 40 displays the layout paper base sheet on the CRT monitor 48 as shown in FIG. 14A, in accordance with the layout paper attribute file "HFILE(i)" and the base sheet data file "DFILE(i)". The designer referring to the display and enters areas where the components are to be laid out by means of the digitizer 50. The area input is carried out to specify diagonal two points "Pms(i,j)" and "Pme(i,j)" as shown in FIG. 14B. The area thus specified is referred as "component area". While, the variable j represents integers 1, 2 through n, each indicating sequence number for component.

Upon receipt of the component area, in step S3, the CPU 40 generates maskfile "MASKFILE(i,J)", and stores mask name "MaskName(i,j)" and specified coordinate data for the two points "Pms(i,j)" and "Pme(i,j)". Further, stored address of the mask file "MASKFILE (i,j)" is recorded in the layout attribute file "HFILE(i)" as "MASKFILE(i,J)ADRS". Next, in step S4, the CPU 40 generates component identifier code "BIDcode (i,j)" for identifying each of the components, and store the component identifier code "BIDcode (i,j)" in the mask file "MASKFILE(i,j)".

Moreover, in step S5, stored address "BIDpatFILE (i,j) ARDS" of the component identifier pattern (bar code pattern) file "BIDpatFILE" corresponding to the component identifier code "BIDcode(i,j)" is stored in the mask file "MASKFILE (i,j)". Also, in the step S5, component file "PARTFILE(i,j)" having variable length record corresponding to the component area is generated, and the stored address "PARTFILE(i,j)ADRS" of the component file is recorded in the mask file "MASKFILE (i,j)". While, so far, component data is not stored in the component file "PARTSFILE (i,j)". In other words, file name of components to be laid out in the component area is determined.

Next, in step S6, it is judged whether or not the processing described in step S2 through S5 have been done for all the component areas. If there are any component area has not processed yet, steps S2 through S5 are performed by successively increasing the variable j by an increment of one. When all the component areas have processed by step S2 through S5, a frame represents the base sheet and frames represent component areas E1 through E7 are displayed as shown in FIG. 14B.

Figure 15:
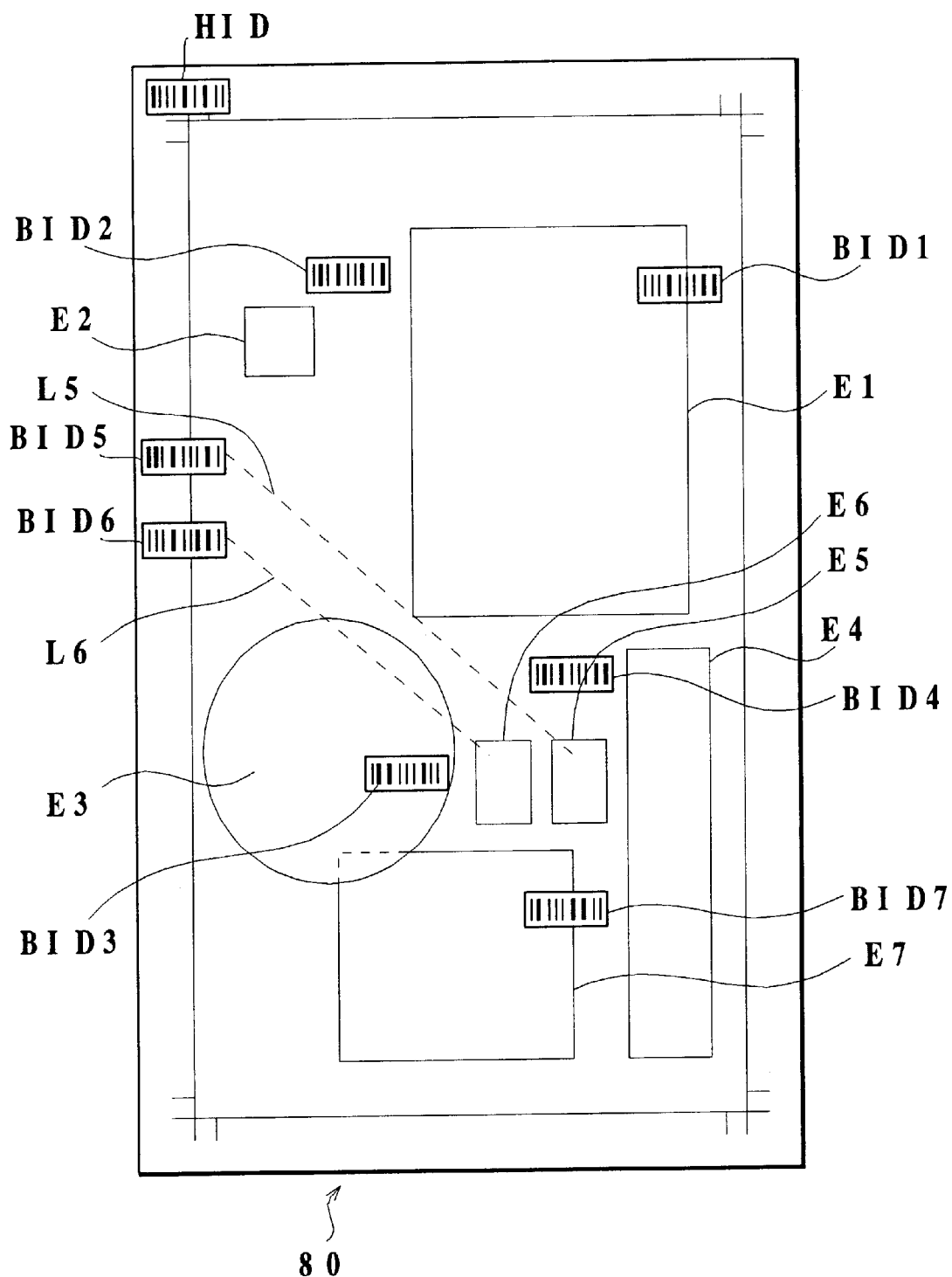
FIG. 15 is a view illustrating a component layout base sheet 80 which is laid out component identifiers.

Once all the component areas have processed by step S2 through S5, the process goes on to the step S7. In the step S7, the CPU 40 determines synthesize location of component identifiers against the component areas and the synthesized location of the layout paper identifiers against the layout paper base sheet. At that time, the CPU 40 determines the synthesize location of the component identifiers BIDI through BID7 to the vicinity of the corresponding component areas E1 through E7 as shown in FIG. 15. On condition that if two component areas locates too close to each other like the E5 and E6, then place relation lines L5 and L6 to clarify a relationship between two component areas, and layout the component identifier BID5 and BID6 in apart from each other. While, the layout paper identifier "HID" is laid out to the upper left corner of the base sheet. Also, synthesize of the each identifier pattern data is temporary one, so that synthesized result is not recorded to the base sheet data file "DFILE(i)".

Next, frame of the layout paper base sheet, layout paper identifier, frame of the component areas and component identifiers are outputted based on the synthesized result. In other words, component layout base sheet 80 shown in FIG. 15 is outputted from the printer 46 (step S8). Then, it is judged whether or not the process have been done for all the layout papers (step S9). If there are any layout paper has not processed yet, steps S1 through S8 are performed by successively increasing the variable i by an increment of one.

Once the component layout base sheet 80 for all the layout papers have outputted, the designer passes the outputted component layout base sheet 80, text component, linework component and image component to the components operator, as well as ask the operator to preparing of electronic data for command sheet. At that time, the designer share the work to plural number of the components operators in consideration of character of the operators.

Figure 16:
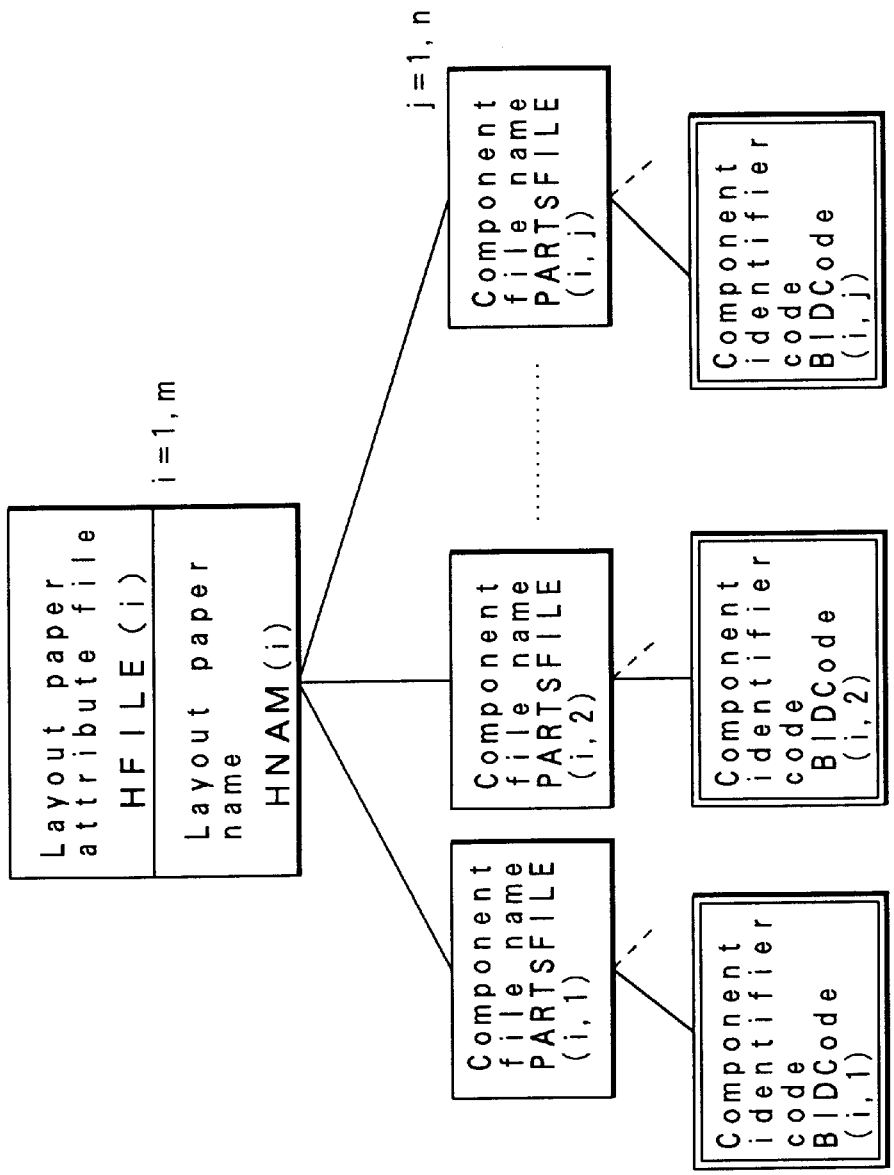
FIG. 16 is a view illustrating a tree structure of a file in each layout papers.

As a result of above processing, the file name of components contained in each layout papers (and corresponding component identifier code) are recorded on the magnetic disk 54 of the computer 30 for designer under the tree structure as shown in FIG. 16.

The work process of a component operator who received the component layout base sheet 80 and the text component 82, 84 will be described using a flow chart shown in FIG. 11 as an example. The component operator inputs the text component 82 from keyboard 64 using the computer 32 for component operators shown in FIG. 7 (step S10). When the input is completed, the electronic data for command sheet is recorded on the magnetic disk 66 once.

Next, the component operator using a bar code reader 70 to read the component identifier "BID1" of the component areas corresponding to the text component 82 of the component layout base sheet 80. Upon receiving the component identifier, the CPU 74 communicate with the computer 30 for designer through the network interface 72, then seek the component file "PARTFILE (i,j)" corresponding to the component identifier "BID1" which is read at the previous process. Further, electronic data for command sheet of inputted text component 82 is recorded to the corresponding component file "PARTFILE (i,j)" which is sought previously, through the network interface 72 (step S11). In other words, the electronic data for command sheet is recorded in the magnetic disk 54 of the computer 30 for designer under name of predetermined component file. While, processing of the text component 84 is similar to above.

Figure 11:
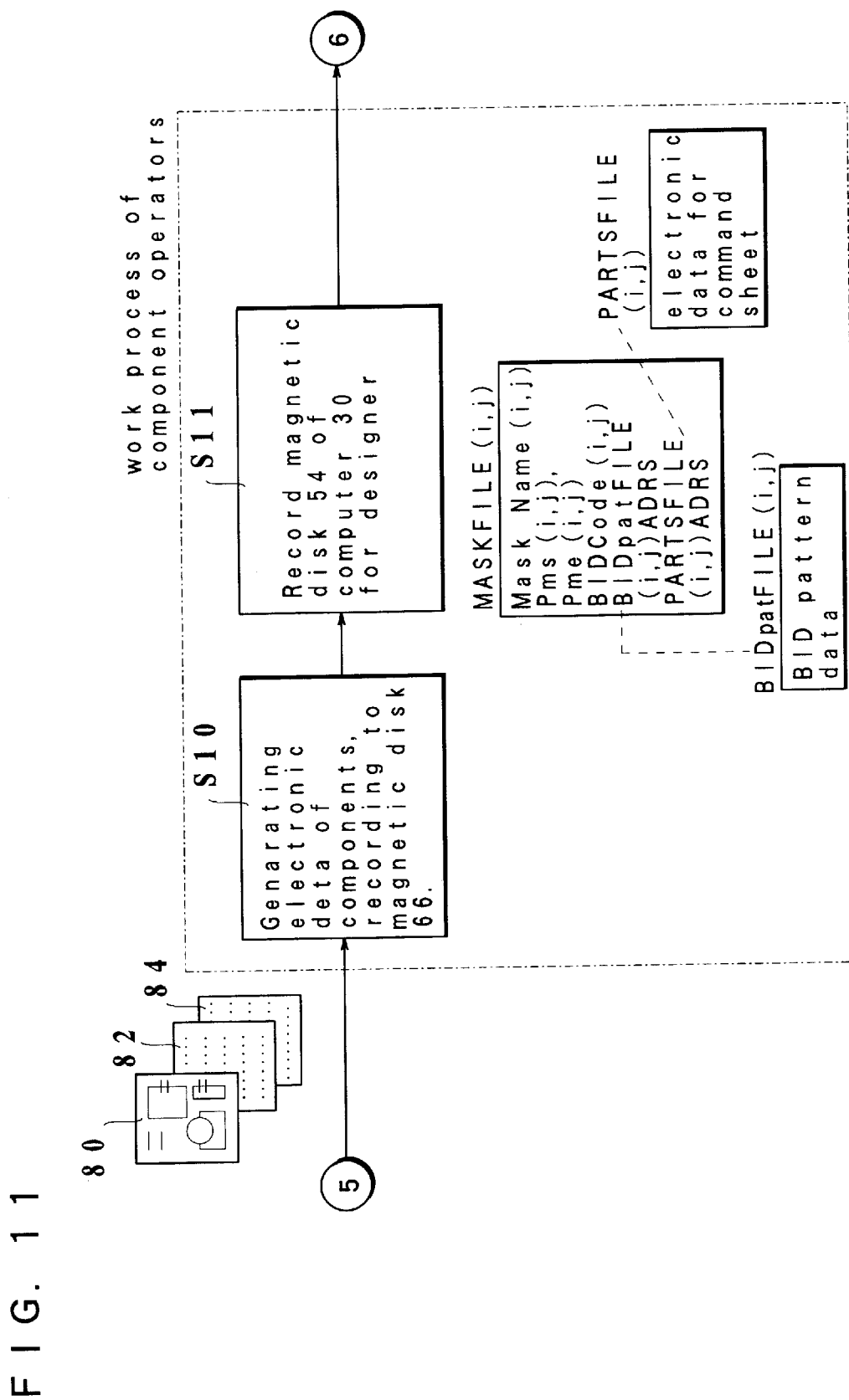
Figure 12:
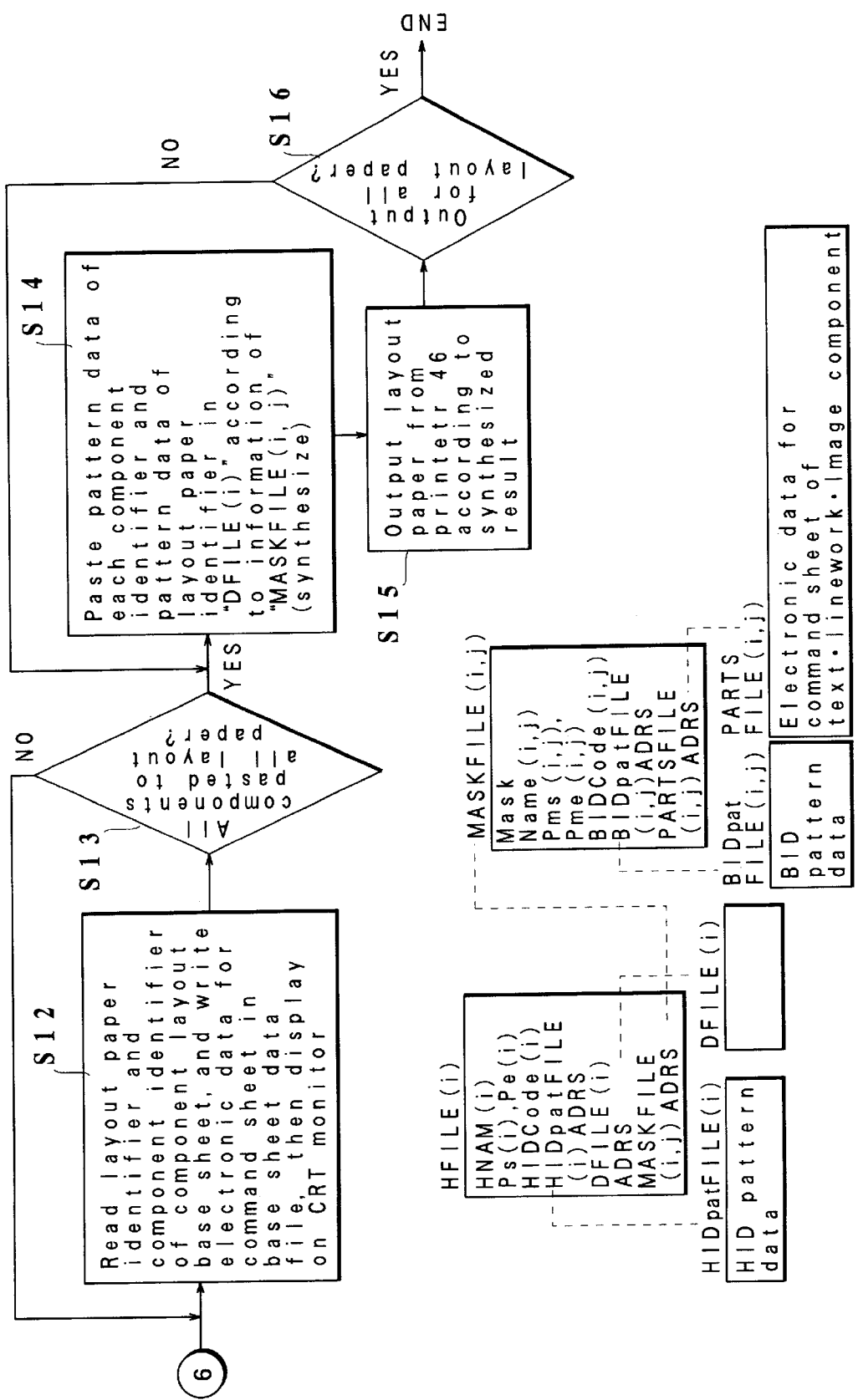

Although work process of the components operator who received the text component is described in the FIG. 11, only difference is to generate electronic data for command sheet using the digitizer when the operator received linework component. Also, in case of receiving the image component (color filter etc.), only the difference from above is to read the component using the input scanner 68 in order to perform color separation, then to make the component as electronic data for command sheet. While, resolution of this scanner 68 here may be coarser than that of an input scanner used in the prepress process.

When all the work for the components operators have been completed, the designer starts their work. The designer reads the layout paper identifier "HID" and component identifier BID1 through BID7 of the base sheet for component layout 80 outputted at the step S8 using the bar code reader 57. On receipt of the identifiers mentioned above, the CPU 40 writes the electronic data for command sheet of the components in the base sheet data file "DFILE(i)" and display the electronic data on the CRT monitor 48 (step S12).

While, it is possible for the CPU 40 to perform pasting automatically without reading the bar codes, since the component areas and the component files are corresponding with each other. However, in this case, both reading by the bar code reader 57 and displaying by the CRT monitor 48 are performed for the purpose of confirming the components. Thus, electronic data of the layout paper or the like are generated. These data is referred as design result data.

Next, it is judged whether or not the process described above has been done for all the components and all the layout papers (step S13). If there are any components or layout papers not processed yet, step S12 is performed until completion of the process for the components and the layout papers. When the process described above is completed, the process goes on to the step S14. In the step S14, pattern data of the component identifier corresponding to each component and pattern data of the layout paper identifier corresponding to layout paper base sheet are pasted in the base sheet data file "DFILE(i)" in accordance with information of "MASKFILE (i,j)". Then, the layout papers are outputted from the printer 46 in order to confirm the synthesized result (step S15). Next, it is judged whether or not all the layout papers have been outputted (step S16). If there are any layout papers not outputted yet, steps S14 and S15 are performed by successively increasing the variable j by an increment of one. When all the layout papers have been outputted, the process is completed.

FIG. 13 shows an example of layout paper 90 as a prepress command sheet thus obtained. In this embodiment, the component identifiers BID1 through BID7 are to be outputted on the layout paper 90. As a result, processing of prepress disclosed later will be done fast.

In the above disclosed embodiment, the designer passes the component layout base sheet 80 to the component operators, it may also indicated the file name which must be stored electronic data of each component, then store the generated electronic data in the file. In that case, above storage can be realized if the bar code reader 70 is not comprised with the computer 32 for component operators.

Also, in above disclosed embodiment, the computer 30 for designer and the computer 32 for components operators are connected with forming a network. However, in case of both the computers are operated independently (stand-alone) and data exchange under online can not be done, the components operator may stores electronic data of the generated components in the FD and pass the FD to the designer. At that time, the designer indicates the component file "PARTSFILE (i,j)" for data storing which is predetermined at step S5 of FIG. 9 to the component operator, and the components operator attaches intended file name "PARTSFILE (i,j)" to the component file then stores them in the FD. The designer who received the FD, stores the electronic data for command sheet of the components in the component file "PARTSFILE (i,j)" of the magnetic disk 54 depending on the file name. Thereupon, it may perform subsequent steps of step S12 in FIG. 12, since exactly the same condition is ready when forming a network in connection.

As disclosed above, once design result data is completed using the computer 30 for designer, preparation for prepress is performed using the computer 34 for operating management, the equipment apparatus 35 for component processing and the computer 36 for component information management (Refer to FIG. 5). In other words, the design result data is transmitted to the computer 34 for operating management, and a layout paper 90 is outputted thereby. Then electronic data for original of image component is generated using the equipment apparatus 35 for component processing according to the layout paper 90. The electronic data for original of image component thus generated is stored on a FD 31, then provide the FD to the computer 36 for component information management. The computer 36 for component information management performs "tie-up" processing for following data by receiving the design result data from the computer 34 for operating management, and reading the electronic data for original stored in the FD 31. Also, the computer 36 performs tie-up processing with the design result data by reading the text component and the electronic data for command sheet from the computer 32 for component operators, and use the electronic data as a electronic data for original.

Figure 17:
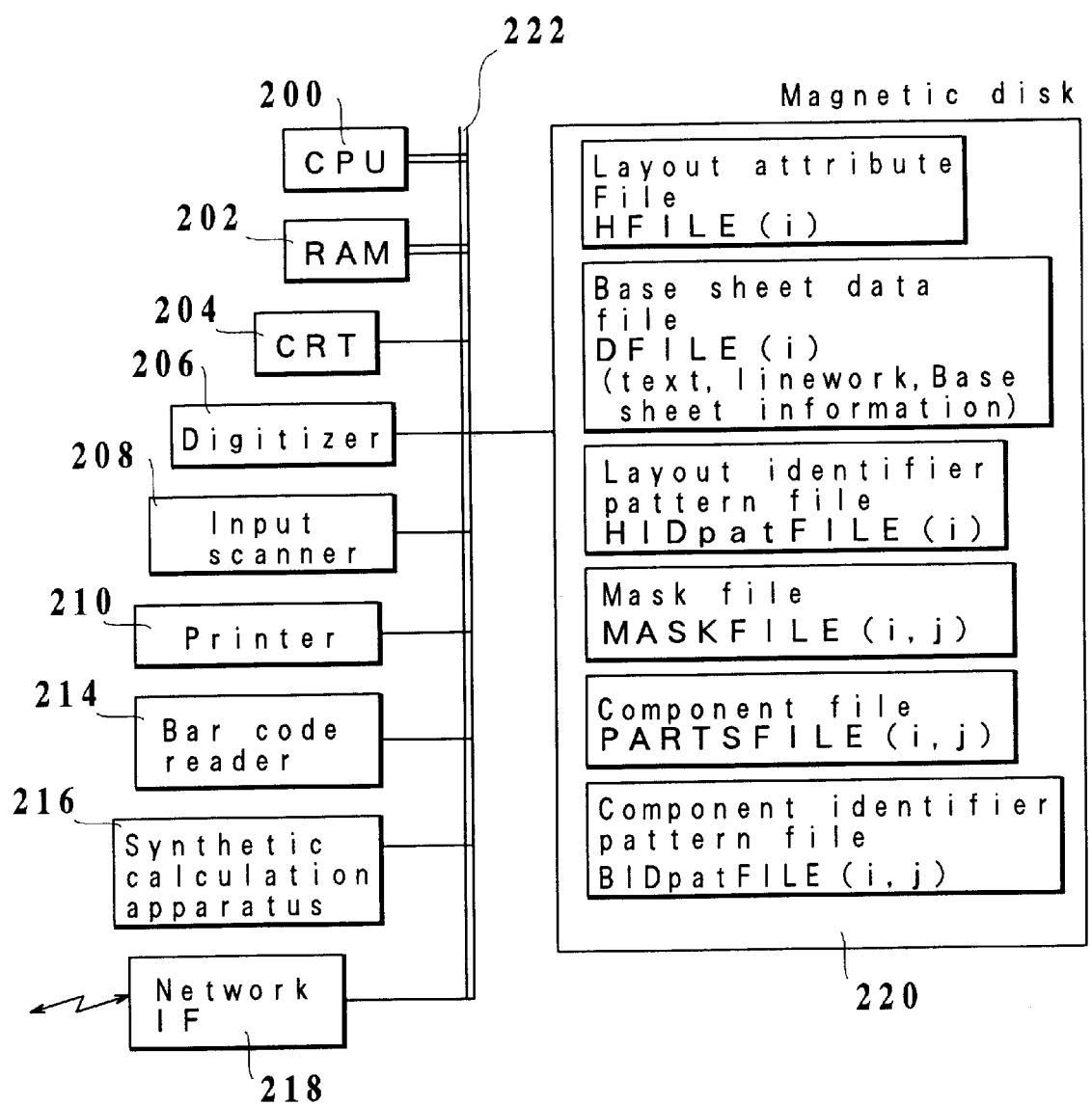
FIG. 17 is a block diagram showing a computer 34 for operating management.

FIG. 17 shows details of the computer 34 for operating management. CPU 200 is connected to a bus line 222. RAM 202, CRT monitor 204, digitizer 206, input scanner 208, printer 210, bar code reader 214, synthesize calculation apparatus 216, network interface 218 and magnetic disk 220 are connected to the bus line 222. FIG. 17 illustrates a view inside of the magnetic disk 220 which incorporate electronic data of the layout paper from the computer 30 for designer.

Figure 18:
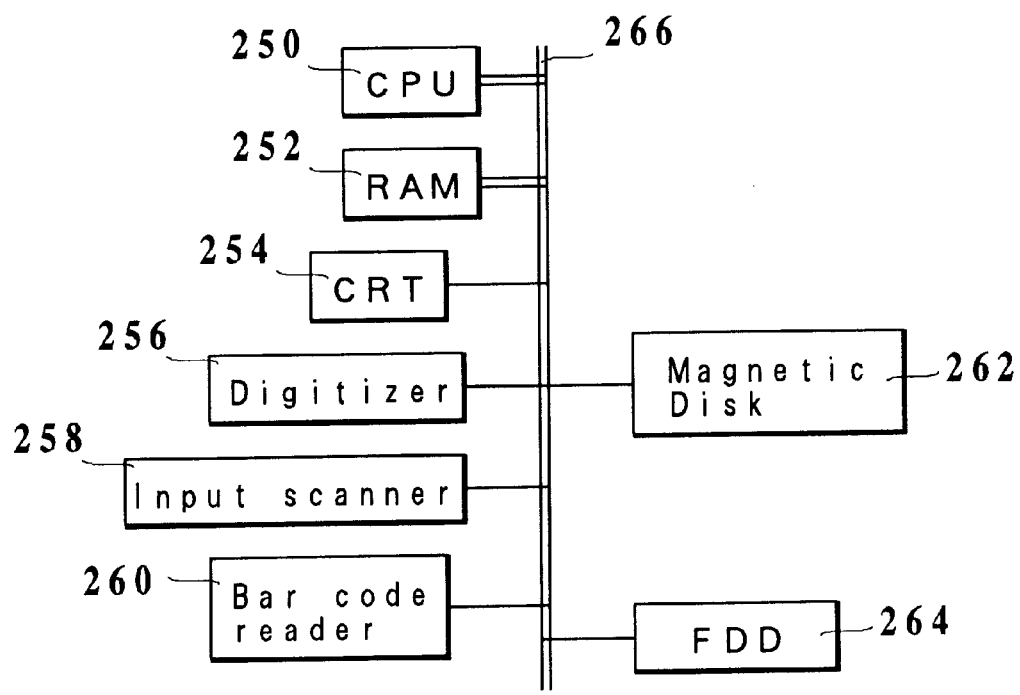
FIG. 18 is a block diagram showing equipment apparatuses for component processing.

FIG. 18 shows details of the equipment apparatus 35 for component processing. CPU 250 is connected to a bus line 266. RAM 252, CRT monitor 254, digitizer 256, input scanner 258, bar code reader 260, magnetic disk 262 and FD drive apparatus (FDD) 264 are connected with the bus line 266.

Figure 19:
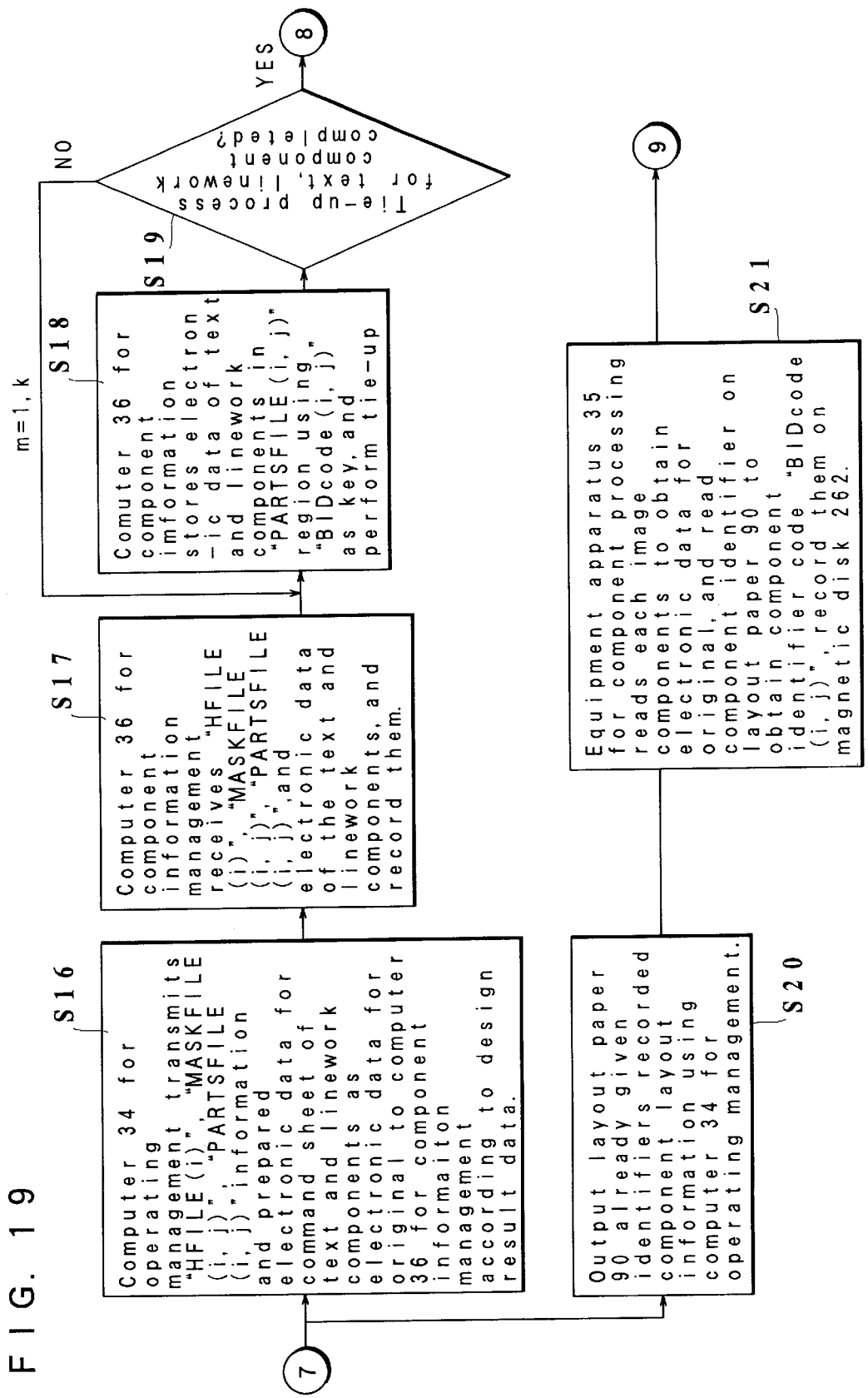
FIG. 19 and FIG. 20 are flow charts showing the preparation processes of the prepress.
Figure 20:
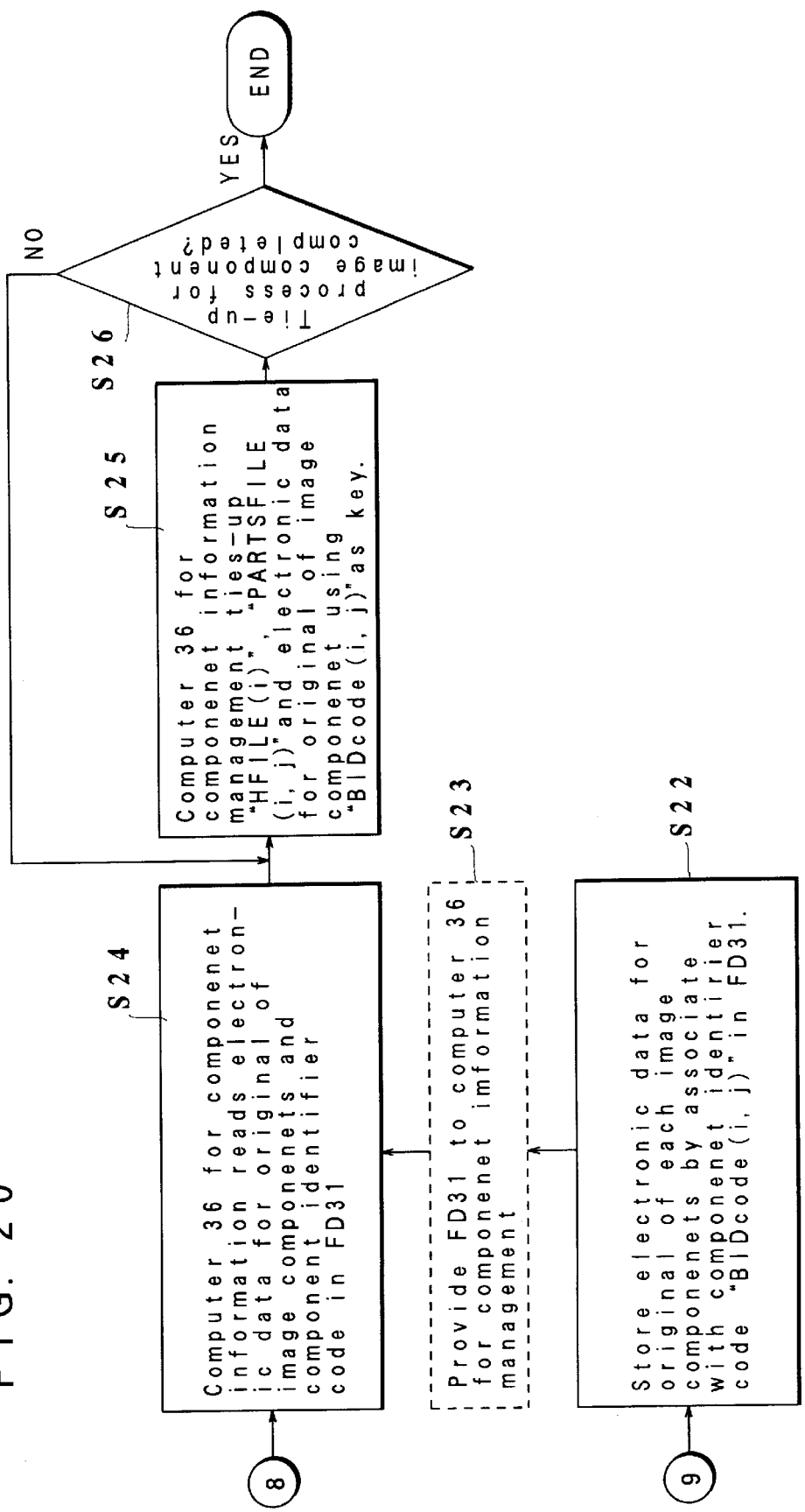

FIG. 19 and FIG. 20 show flow charts to perform the preparation processes of the prepress. First, the computer 34 for operating management obtained the design result data from the computer 30 for designer through the network interface 218, and store the design result data on the magnetic disk 220 in step S16. Further, the computer 34 for operating management transmit the electronic data "HFILE (i)", "MASKFILE(i,j)" and "PARTSFILE(i,j)" related with each file name of the layout paper attribute, mask and parts to the computer 36 for component information management among the design result data. The computer 34 selects the text data and the linework data for command sheet from the design result data, and transmits selected data to the computer 36 for component information management as the electric data for original. The reason for the transmission is that concerning to the text concerning to the text component and the linework component in this embodiment, the electronic data for command sheet is identical with the electronic data for original. The computer 36 for component information management received these electronic data for original, then store the electronic data into a memory apparatus thereby (step S17). While, electronic data of the text component and the linework component are associated with the component identifier and recorded in step S11 shown in FIG. 11. So that, the computer 36 for component information management records the component identifier as well.

The computer 36 for component information management associates a stored location of electronic data for component "PARTSFILE (i,j)" which is recorded under tree structure shown in FIG. 16 with electronic data for original of the text component and linework component using the component identifier code "BIDcode (i,j)" as a key. The electronic data for original of the text and linework component thus associated are stored into the tree structure shown in FIG. 16 and perform "tie-up" processing (step S18). The "tie-up" processing is performed to all the text component and linework component (step S19). Thereupon, the text component and linework component are "tied-up" under online bases.

Also, the computer 34 for operating management outputs the layout paper 90 according to the design result data in step S20 (Refer to FIG. 13). The outputted layout paper 90 are handed to an operator with the image components 92 through 96 (Refer to FIG. 5). The operator performs his or her work using the equipment apparatus 35 for component processing according to the received layout paper 90 and the image components 92 through 96.

In step S21, first, the image components 92 through 96 are read by the input scanner 258, then the components are recorded on the magnetic disk 262 as electronic data for original. Resolution of the input scanner 258 is much higher than that of the input scanner 68 (Refer to FIG. 7) used in the design process. At the reading process, the operator reads the component identifiers BID 3, BID 6, BID 7, BID 5 and BID 4 (Refer to FIG. 13) corresponding to the layout paper 90 using the bar code reader 260 for respective image components 92, 93, 94, 95 and 96, the component identifier code "BIDcode (i,j)" of the component identifiers are recorded on the magnetic disk 262 (step S21). Upon generating all the electronic data for original, the electronic data for original is stored on the FD 31 using the FDD 264 (step S22). At the same time, the electronic data for original of each image components are associated with the component identifier code "BIDCode(i,j)", and stored in the FD 31 as shown in FIG. 21. The electronic data for original is represented as Image (i,j) in FIG. 21.

The FD 31 is provided to the computer 36 for component information management (step S23). At the computer 36 for component information management, the electronic data for original of the image component and the component identifier code "BIDcode (i,j)" stored in the FD 31 are read (step S24). Next, the computer 36 for component information management stores the electric data for original of the image component in the tree structure shown in FIG. 16 using the "BIDCode (i,j)" as a key, then performing "tie-up" processing (step S25). In other words, the electronic data for original of the image component (recorded under file name of BIDcode (i,j)) which is read from the FD 31, is stored in the tree structure represented as HFILE(i), PARTSFILE (i,j).

Once the "tie-up" processing for one of electronic data for original is completed, the "tie-up" processing is performed for another electronic data for original by an increment of variable j. In other words, the process of step S25 is repeated. If the "tie-up" processing has been completed for all the image components(step S26), all the work is finished.

Figure 1:
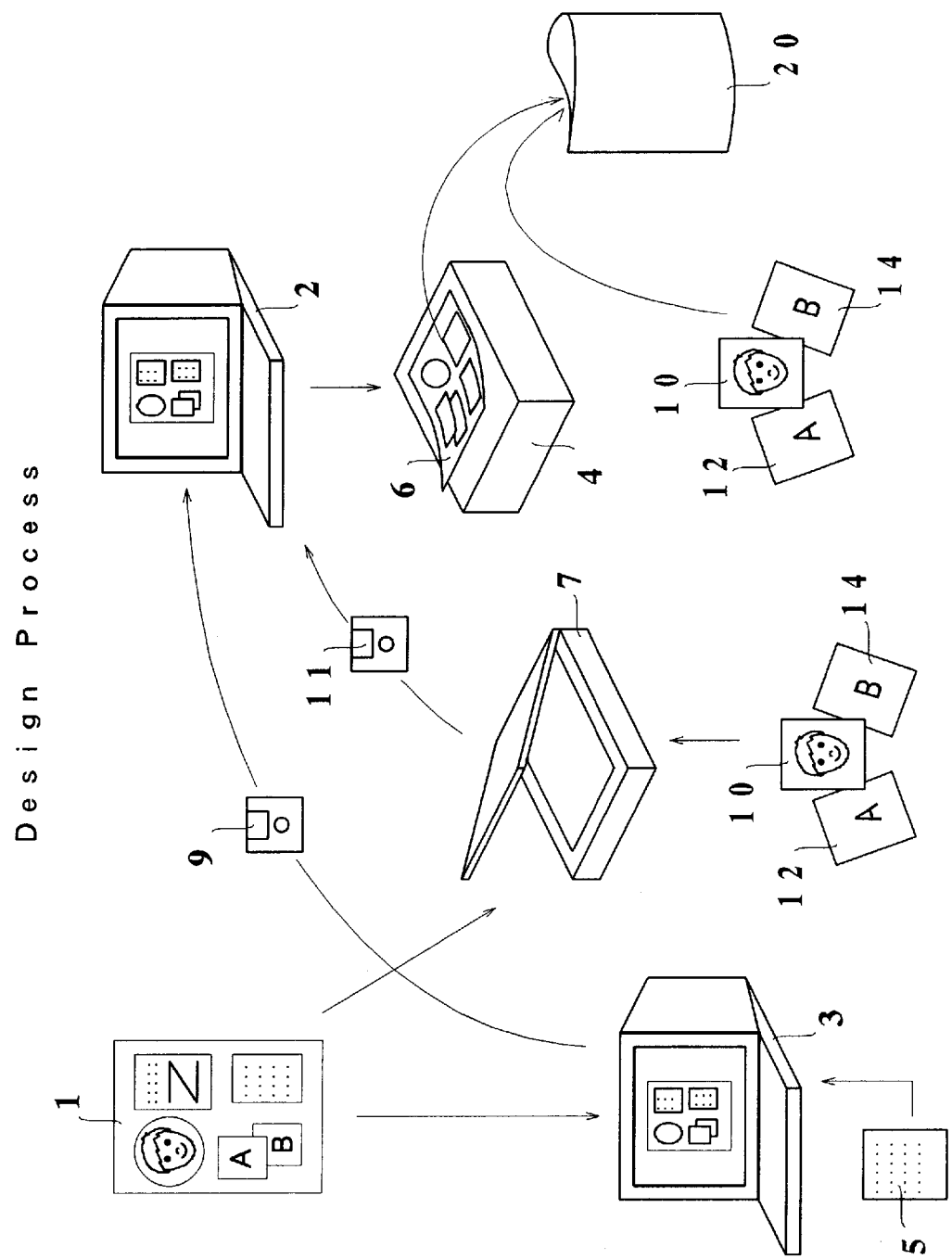
FIG. 1 is a conceptual diagram showing conventional design process.
Figure 3B:
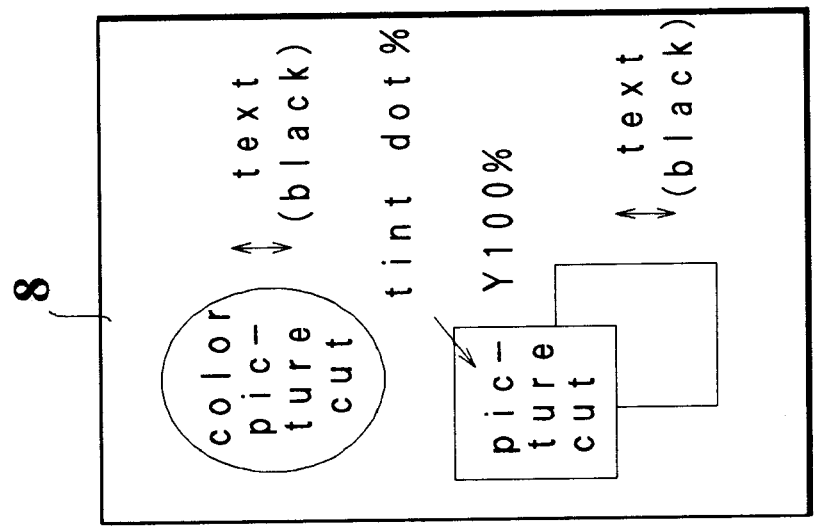
FIG. 3B is a view illustrating an instruction sheet 8.
Figure 3A:
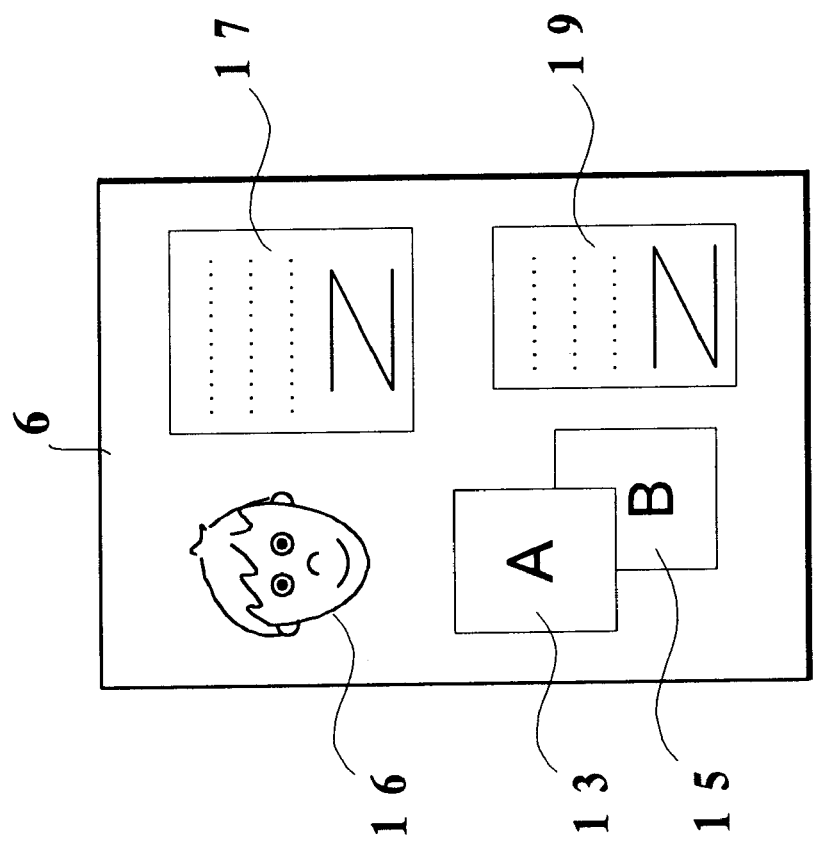
FIG. 3A is a view illustrating a layout paper 6.
Figure 4:
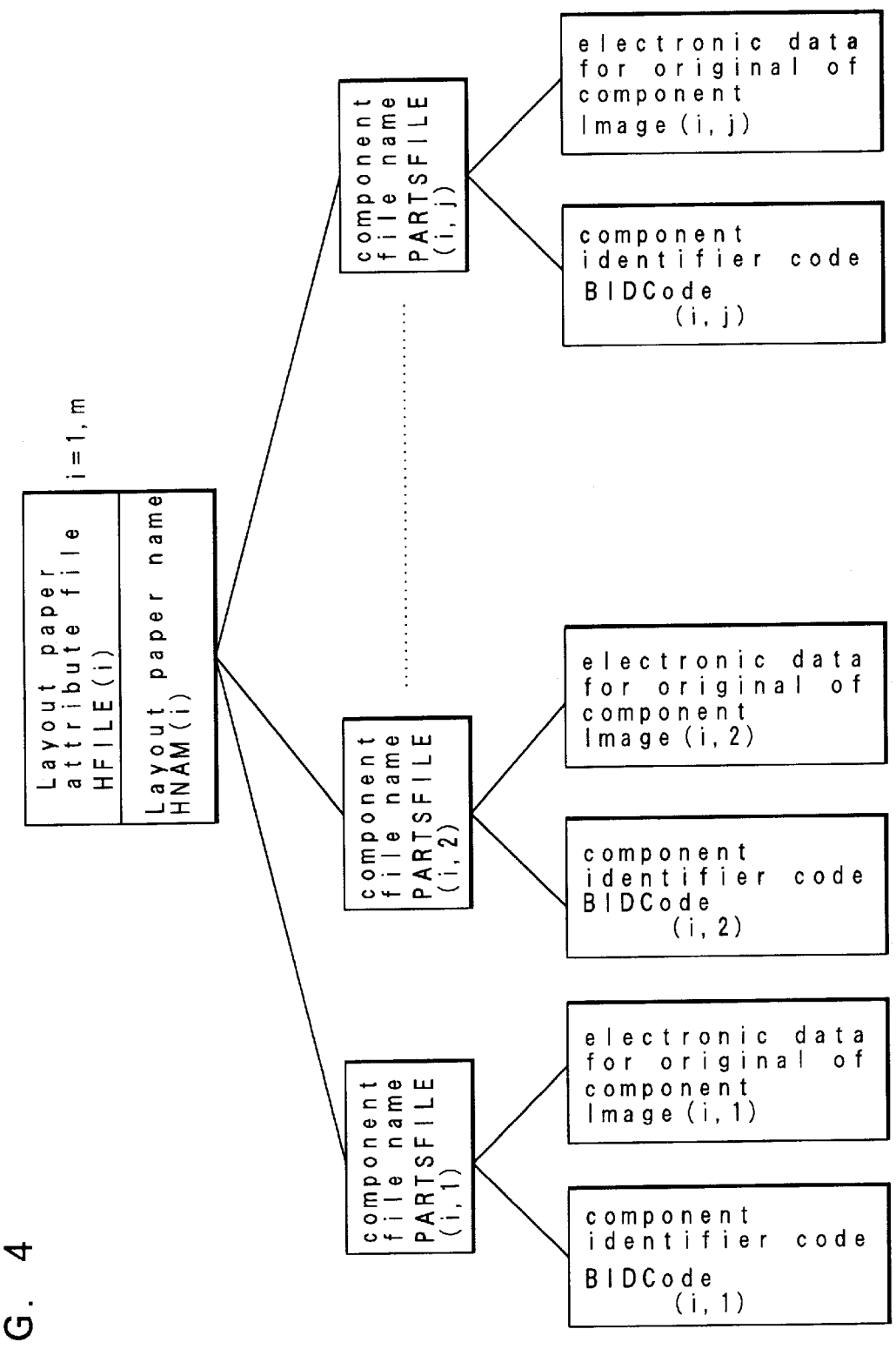
FIG. 4 is a view illustrating a tree structure of a file using in a method for managing component data for prepress as an embodiment of the present invention.

As disclosed above, the "tie-up" process for text component, linework component and electronic data for original of image component are completed. So that, the electronic data for original of components is recorded under tree structure for each layout paper into the computer 36 for component information management as show in FIG. 4. Therefore, it is possible to seek the electronic data for original of components readily at later processes. While, the data recorded in the computer 36 for component information management is transferred to the magnetic disk of the computer 26, 178 for prepress (Refer to FIG. 22).

Figure 22:
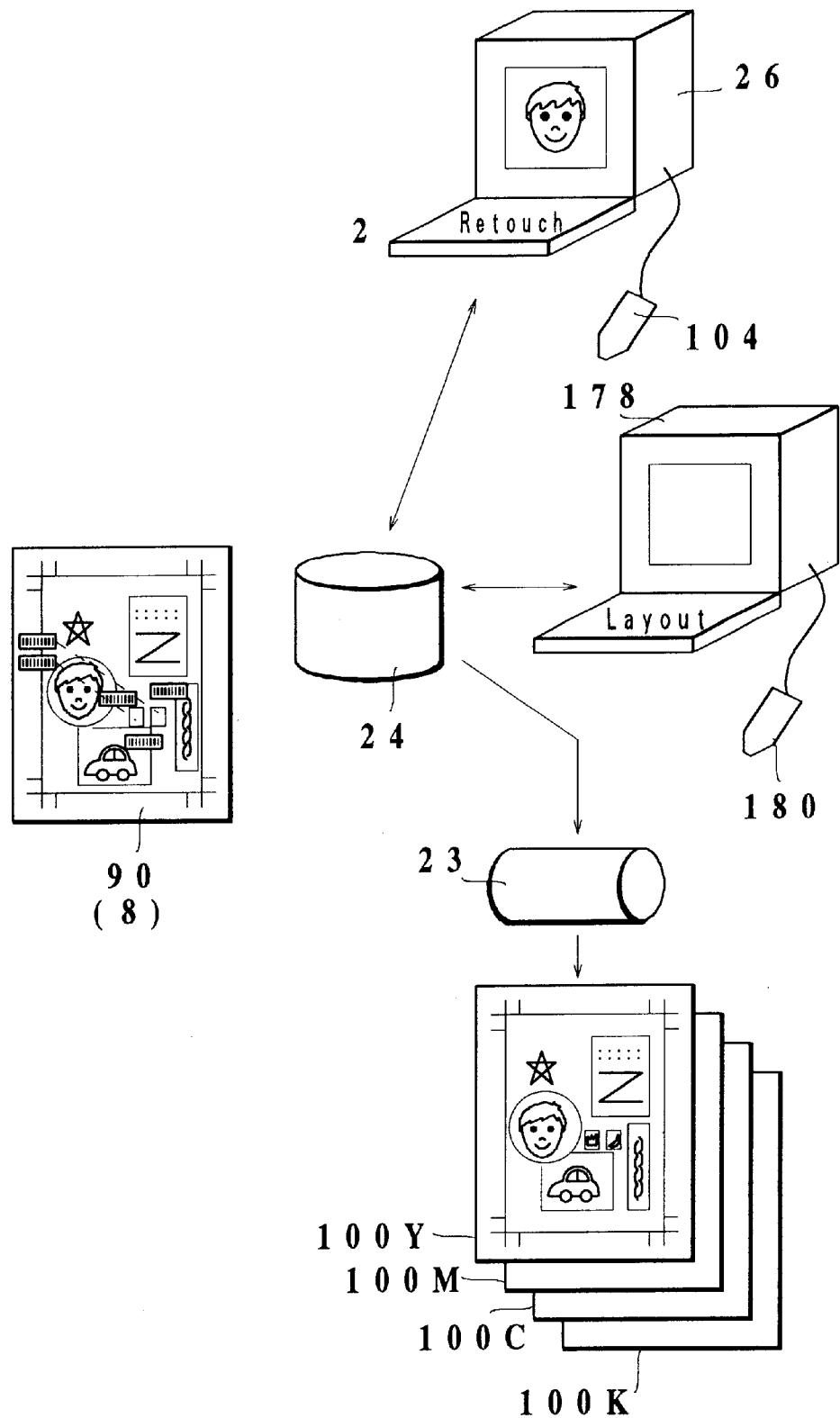
FIG. 22 is a view explaining concept of prepress processes.

Next, processing in the prepress process will be explained in accordance with FIG. 22. The prepress operator reads the electronic data for original of the image components 92, 93, 94, 95, and 96 which is recorded on the magnetic disk 24 of the computer, displays them on the monitor, then retouches the image components 92, 93, 94, 95 and 96 according to the layout paper 90 and the command sheet. At this time, the operator read the component identifier located on the layout paper 90 corresponding to the image component which he or she intends to read by the bar code reader 104, and input them. The computer 26 reads the electronic data for original of the image component from the magnetic disk 24 in accordance with the component identifiers which already have read. Therefore, the operator can read the electronic data for original of image component accurately by only tracing the bar code with the bar code reader 104, so that the work is done fast.

The electronic data for original of image components thus retrieved is cut to the size indicated on the command sheet and the layout paper 90, adjusted for their hues, enlarged or contracted, or rotated. The retouched electronic data for original of image components are again stored on the magnetic disk 24.

Next, each components is laid out (collected) according to the layout paper 90 and the command sheet using the computer 178 for prepress. Here too, reading of the electronic data for original of the image components 92 through 96 is done by only tracing the component identifier with the bar code reader 180. Also, when retrieve the text component and electronic data for original of linework component, it is done by only tracing the component identifier with the bar code reader 180.

The collected data are again stored on the magnetic disk 24. Single color films 100Y, 100M, 100C, and 100K are prepared and used for exposure work and succeeding development work to produce printing plates (not shown) in respective colors.

The bar code was used as a component identifier in the embodiments described above, other kinds of identifiers which can be optically read may be used. Or the identifier may be such that can be read magnetically or electrically.

While the component identifier is recorded on the layout paper 90 in the embodiments described above, the component identifier may also be recorded on the command sheet which is overlaid on the layout paper 90 when it is used. In that case, it suffices to place the component identifier in the vicinity of the component area when the command sheet is overlaid on the layout paper 90.

Also, the layout paper 90 and the command sheet are made out on different sheets in the embodiments described above, it may also be constituted to enter the contents of the command sheet from the keyboard 52 shown in FIG. 6, so that the layout paper 90 is outputted including the contents of the command sheet.

Further, in the embodiments described above, the electronic data for command sheet is used as the electronic data for original without any changes, since the electronic data for command sheet and the electronic data for original can be identical with each other as to the text component and the linework component. In respect to the image component, the electronic data for command sheet can be used as the electronic data for original. Also, it is possible to generate the electronic data for original all over again as to the text component and the linework component.

Also, data transfer between the computers are performed under online bases in the embodiments described above, it may also perform the data transfer under offline bases such as using FD etc, on the contrary, it may perform the data transfer under online bases instead of some part performed offline data transfer in the embodiment described above.

According to the embodiment described above, the "tie-up" processing is performed by inserting the electronic data for original into the tree structure which is recorded for file name of the electronic data for original of component contained in the base sheet, and defining file name associated with the component areas to be stored in the electronic data, in prior to generate the electronic data for each components. Therefore, it is possible to manage the component data from design process to prepress process unitarily.

Further, according to the present invention, it is easy to perform "tie-up" with the electronic data for original, since the component layout base sheet laid out the identifiers corresponding to each component areas is outputted, then the identifiers on the base sheet are read to obtain the file names.

According to the present invention, it is much easier to perform data management of each components, once the command sheet is to be used at the same time, since the prepress command sheet is outputted in accordance with the component layout information and the electronic data for command sheet.

Also, In accordance to the present invention, it is not necessary to generate the electronic data for prepress repeatedly, since the electronic data for command sheet is used as the electronic data for original without any changes when the electronic data for command sheet and the electronic data for prepress can be identical with each other.

Further, according to the present invention, the component layout base sheet laid out the identifiers corresponding to the each component areas is outputted, and the identifiers attached on the base sheet are read. Therefore, the operator can read file name of electronic data for command sheet of the components and file name of electronic data for original easily, so that the work efficiency and management efficiency can be increased.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method of storing electric data representative of components of an image for a printing process, comprising the steps of;
    a) determining a special layout of components on an image plane,
    b) determining file names for said components:
    c) storing a tree structure of said file names in accordance with said special layout of said components on an image plane;
    d) generating a layout instruction for instructing said special layout of said components on said image plane;
    e) obtaining electric data representative of said components included in said layout instruction,
    f) storing said electric data in electric files provided with said file names, whereby said electric data are filed in accordance with said tree structure.

2. The method of claim 1, wherein
the step d) includes the steps of:
    d-1) generating a preliminary instruction for instructing respective locations of said components on said image plane;
    d-2) generating preliminary electric data representing preview images for said components included in said preliminary instruction; and
    d-3) assigning said preview images to said respective locations to obtain said layout instruction.

3. The method of claim 2, wherein
the step d-1) includes the step of:
    d-1-1) printing a first layout sheet on which said respective locations are represented together with index codes, and
the step d-3) includes the steps of:
    d-3-1) reading said index codes represented on said first layout sheet; and
    d-3-2) relating said preliminary electric data to said respective locations in accordance with said index codes.

4. The method of claim 3, wherein
the step d-3) further includes the step of:
    d-3-3) printing a second layout sheet on which said preview images are represented at said respective locations together with said index codes, and
the step f) includes the step of:
    f-1) reading said index codes on said second layout sheet; and
    f-2) relating said electric data to said respective locations in accordance with said index codes.

5. The method of claim 2, wherein
said electric components includes a character component and/or a line work component, and
the step e) includes the step of:
    e-1) for said character component and/or said line work component, using said preliminary electric data as said electric data.

6. A system for storing electric data representative of components of an image for printing process, comprising;
    a) means for inputting a special layout of components on an image plane;
    b) means for storing tree structure of file names for said components in accordance with said special layout of said components on an image plane;
    c) means for generating a layout instruction for instructing said special layout of said components on said image plane;
    d) means for obtaining electric data representative of said components included in said layout instruction,
    e) means for storing said electric data in electric files provided with said file names, whereby said electric data are filed in accordance with said tree structure.

7. A method of managing component data for a printing process using component layout information corresponding to a plurality of component areas laid out on a base sheet, each component area corresponding to either an image component, text component or linework component, comprising the steps of:
    generating component layout information and recording the layout information in a storage device, the step of generating component layout information including the steps of
        determining a size of the base sheet and size of component areas of respective components to be laid out on the base sheet,
        determining a file name for each component to be laid out in each component area, and
        recording each file name in the storage device, the file name for each component being stored in a tree structure of files;
    generating original of component data for each component having a file name in the storage device; and
    placing the generated original of component data into tree structure according to the file name.

8. The method of claim 7, wherein
the step of generating component layout information includes,
    laying out either electrically, magnetically or optically readable identifiers corresponding to each file name for each component to be laid out in each component area, and
    outputting a component layout base sheet with the component areas and the identifiers; and
the step of generating original of component data includes
    obtaining the file name corresponding to each component by reading the identifiers of respective component areas on the component layout base sheet using a reader, and recording the original of component data in the storage device corresponding to the file name.

9. The method of claim 7, further comprising the steps of:

generating component data for command sheet corresponding to each component area, and recording the component data for command sheet of each component attached with the file name determined in the step of generating component layout information, generating prepress command sheet data using the component data for command sheet of each component recorded with the attached file name, and outputting the prepress command sheets.

10. The method of claim 9, wherein the data for command sheet is used as the data for original of component data in the step of generating original of component data when the data for command sheet and original of component data can be identical.

11. The method of claim 9, wherein the step of generating component layout information includes, laying out either electrically, magnetically or optically readable identifiers corresponding to each file name for each component to be laid out in each component area, and outputting a component layout base sheet with the component areas and the identifiers;

the step of generating component data for command sheet includes, obtaining the file name corresponding to the components by reading the identifiers of respective component areas on the component layout base sheet using a reader, and recording the data for command sheet of the component corresponding to the file name; and the step of generating original of component data includes obtaining the file name corresponding to each component by reading the identifiers of respective component areas on the component layout base sheet using the reader, and recording the original of component data in the storage device corresponding to the file name.

12. A system for managing component data for design and prepress process using component layout information corresponding to a plurality of component areas laid out on a base sheet, each component area corresponding to either an image component, text component or linework component, comprising:

designer processing means for determining size of the base sheet and component area of each component to be laid out on the base sheet, said designer processing means having a memory means for recording the size of the base sheet and component area of each component as electronic data, said memory means storing file name data of each component to be laid out in each of the component areas in a tree structure;

component operator processing means for generating electronic data for command sheet for each component, and recording the data for command sheet for each component in the designer processing means with a file name attached, the attached file name being obtained via communication of the component operator processing means with the designer processing means;

command sheet generating means for generating and outputting each command sheet using the tree structure of file name data of each component recorded in the memory means of the designer processing means and data for command sheet; and tie-up means for receiving original of component data of each component with a file name attached, and inserting the original of component data in the tree structure of file name data of components recorded in the memory means of the designer processing means.

\* \* \* \* \*